US012063725B2

(12) United States Patent
Jung et al.

(10) Patent No.: US 12,063,725 B2
(45) Date of Patent: Aug. 13, 2024

(54) DISPLAY PANEL AND DISPLAY DEVICE

(71) Applicant: Samsung Electronics Co., Ltd., Gyeonggi-do (KR)

(72) Inventors: Hoyoung Jung, Gyeonggi-do (KR); Nari Kim, Gyeonggi-do (KR); Kyongtae Park, Gyeonggi-do (KR); Hongkook Lee, Gyeonggi-do (KR); Yongkoo Her, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

(21) Appl. No.: 17/695,104

(22) Filed: Mar. 15, 2022

(65) Prior Publication Data

US 2022/0225481 A1 Jul. 14, 2022

Related U.S. Application Data

(63) Continuation of application No. PCT/KR2021/018139, filed on Dec. 2, 2021.

(30) Foreign Application Priority Data

Jan. 14, 2021 (KR) ........................ 10-2021-0005338

(51) Int. Cl.
*H05B 45/325* (2020.01)
*G09G 3/32* (2016.01)
(Continued)

(52) U.S. Cl.
CPC ........... *H05B 45/325* (2020.01); *H05B 45/24* (2020.01); *H05B 45/33* (2020.01)

(58) Field of Classification Search
CPC ...... H05B 45/30; H05B 45/325; H05B 45/33; G09G 3/20; G09G 3/2011; G09G 3/2014;
(Continued)

(56) References Cited

U.S. PATENT DOCUMENTS

| | | | |
|---|---|---|---|
| 7,825,612 | B2 | 11/2010 | Lee |
| 10,713,996 | B2 | 7/2020 | Kim et al. |

(Continued)

FOREIGN PATENT DOCUMENTS

| | | |
|---|---|---|
| EP | 3735685 | 12/2019 |
| KR | 10-0780321 B1 | 11/2007 |

(Continued)

OTHER PUBLICATIONS

Korean Search Report dated Jan. 14, 2021.
Written Opinion dated Jan. 14, 2021.

*Primary Examiner* — Thai Pham
(74) *Attorney, Agent, or Firm* — Cha & Reiter, LLC

(57) ABSTRACT

A display panel is disclosed. The display panel may include a plurality of LED elements, and may further include a substrate including a first driving circuit including a pulse width modulation (PWM) driving circuit and a second driving circuit including a pulse amplitude modulation (PAM) driving circuit. The plurality of LED elements may include a first LED element configured to emit light of a first color, and which is controlled by the first driving circuit, and a second LED element configured to emit light of a second color different from the first color, and which is controlled by the second driving circuit.

13 Claims, 11 Drawing Sheets

1000

1000

(51) Int. Cl.
*H05B 45/24* (2020.01)
*H05B 45/33* (2020.01)

(58) Field of Classification Search
CPC ......... G09G 3/2003; G09G 2300/0452; G09G 2320/0242; G09G 3/32; G09G 3/3233
See application file for complete search history.

(56) References Cited

U.S. PATENT DOCUMENTS

| | | | | |
|---|---|---|---|---|
| 10,720,098 | B2 | 7/2020 | Valentine | |
| 10,832,615 | B2 | 11/2020 | Kim et al. | |
| 11,056,047 | B2 | 7/2021 | Shigeta et al. | |
| 11,100,840 | B2 | 8/2021 | Kim et al. | |
| 2018/0301080 | A1* | 10/2018 | Shigeta | G09G 3/32 |
| 2019/0371232 | A1* | 12/2019 | Kim | G09G 3/2011 |
| 2020/0135092 | A1 | 4/2020 | Ahmed | |
| 2020/0265777 | A1* | 8/2020 | Shigeta | G09G 3/3233 |
| 2020/0312216 | A1* | 10/2020 | Kim | G09G 3/32 |
| 2020/0394953 | A1 | 12/2020 | Kim et al. | |
| 2021/0210002 | A1* | 7/2021 | Kim | G09G 3/2014 |
| 2021/0241682 | A1* | 8/2021 | Jung | H01L 27/156 |

FOREIGN PATENT DOCUMENTS

| | | | |
|---|---|---|---|
| KR | 10-2007-0115467 | A | 12/2007 |
| KR | 10-0867551 | B1 | 10/2008 |
| KR | 10-2018-0043056 | A | 4/2018 |
| KR | 10-2019-0137658 | A | 12/2019 |
| KR | 10-2020-0088696 | A | 7/2020 |
| KR | 10-2020-0101605 | A | 8/2020 |
| KR | 10-2020-0115003 | A | 10/2020 |
| WO | 2019-231074 | A1 | 12/2019 |

* cited by examiner

DISPLAY PANEL AND DISPLAY DEVICE

CROSS-REFERENCE TO RELATED APPLICATIONS

This application is a bypass continuation of International Application No. PCT/KR2021/018139, filed on Dec. 2, 2021, which claims priority to Korean Patent Application No. 10-2021-0005338, filed on Jan. 14, 2021, in the Korean Intellectual Property Office, the disclosures of which are herein incorporated by reference in their entirety.

BACKGROUND

1. Field

One or more embodiments of the instant disclosure generally relates to a display panel and a display device, and more particularly, to a display panel where light emitting elements constitute pixels, and a display device including the same.

2. Description of Related Art

A display device is an output device which includes a display panel and a processor controlling the same, and outputs light of various colors by operating the display panel in pixel or sub-pixel units. As display technologies have developed, there has been continuous technical demand for high luminance and high resolution for display panels.

Various types of display panels exist in the art. One such type is light emitting diode (hereinafter, referred to as 'LED') panels, and more specifically micro LED panels that use inorganic light emitting materials to emit light. One advantage micro LED panels have over LED panels is that instead of having one light source serving as a backlight for the entire panel, micro LED panels use a plurality of LEDs that each may serve as a light source for a single pixel. Micro LEDs are being widely used as light sources for various types of display devices of various electronic products such as TVs, mobile phones, monitors, and laptop computers.

In particular, micro LED may refer to a micro size LED whose size is on the order of micrometers (μm), and these micro LEDs are smaller than general light emitting diode (LED) chips. Micro LEDs are manufactured in the form of chips on a wafer (a growth substrate) by using an epi manufacturing process. Micro LEDs manufactured as such may be included in a display module when they are transferred on a target substrate.

When an inorganic light emitting element such as a red LED, a green LED, and a blue LED of a display panel is driven as sub pixels, if the gradation of the sub pixels is expressed by controlling an amplitude of a driving current of the inorganic light emitting element, not only the gradation but also the wavelength of the emitted light changes together according to the amplitude of the driving current. This unintended shift in wavelength causes color shift phenomenon, which reduces color reproducibility and fidelity of images displayed by the display panel.

Also, when the amplitude and the pulse width of the driving current of the inorganic light emitting element of the display panel are controlled simultaneously, there may be problems in that transistors of a driving circuit driving the inorganic light element must have a certain size, which limits how much the driving circuit can be minimized.

SUMMARY

According to an embodiment of the disclosure, a display device including a plurality of LED elements includes a substrate including a first driving circuit including a pulse width modulation (PWM) driving circuit and a second driving circuit including a pulse amplitude modulation (PAM) driving circuit, where the plurality of LED elements may include a first LED element configured to emit light of a first color, and which is controlled by the first driving circuit, and a second LED element configured to emit light of a second color different from the first color, and which is controlled by the second driving circuit.

The first driving circuit controls the driving of the first LED element based on a degree of color shift caused by a gradation of the second LED element controlled by the second driving circuit.

The first driving circuit further comprises a constant current generation (CCG) circuit configured to control an amount of electric current provided to the first LED element based on a data signal provided through a data line.

The substrate further comprises a third driving circuit including a PAM driving circuit, and the plurality of LED elements further comprise a third LED element configured to emit light of a third color different from the first color and the second color, and which is controlled by the third driving circuit.

The substrate further comprises a third driving circuit including a PWM driving circuit, and the plurality of LED elements further comprise a third LED element configured to emit light of a third color different from the first color and the second color, and which is controlled by the third driving circuit.

The third driving circuit further comprises a CCG circuit configured to control an amount of electric current provided to the third LED element based on a data signal provided through a data line.

In the substrate, an area occupied by the first driving circuit is wider than an area occupied by the second driving circuit.

In the substrate, the area occupied by the first driving circuit overlaps with at least a part of a light emitting area where the second LED element is arranged on the substrate.

In the substrate, the area occupied by the first driving circuit is wider than the area occupied by the second driving circuit or an area occupied by the third driving circuit.

The first driving circuit includes more transistors than the second driving circuit.

The first color is green, the second color is one of red or blue, and the third color is the other one of red or blue different from the second color.

The display device further comprises a gate line connected with the first driving circuit; a PWM line connected with the PWM driving circuit, and disposed in a same direction as the gate line; and a display driver IC (DDI) configured to generate a signal and transmit the signal to the PWM line, where the PWM driving circuit controls the length of a light emitting period of the first LED element based on the signal transmitted from the PWM line and a gradation signal.

According to an embodiment of the disclosure, in a display panel including a plurality of LED elements, the plurality of LED elements include a first LED element configured to emit light of a first color, and which is controlled by a first driving circuit, and a second LED element configured to emit light of a second color different from the first color, and which is controlled by a second driving circuit, where the first driving circuit may be driven such that the length of a light emitting period of the first LED is changed as a gradation of the first LED element is changed, and the second driving circuit may be driven such that the length of a light emitting period of the second LED is maintained as a gradation of the second LED element is changed.

The first driving circuit controls the driving of the first LED element based on a degree of color shift caused by the gradation of the second LED element controlled by the second driving circuit.

The first driving circuit and the second driving circuit are provided on a substrate, and in the substrate, an area occupied by the first driving circuit is wider than an area occupied by the second driving circuit.

DETAILED DESCRIPTION

Figure 1:
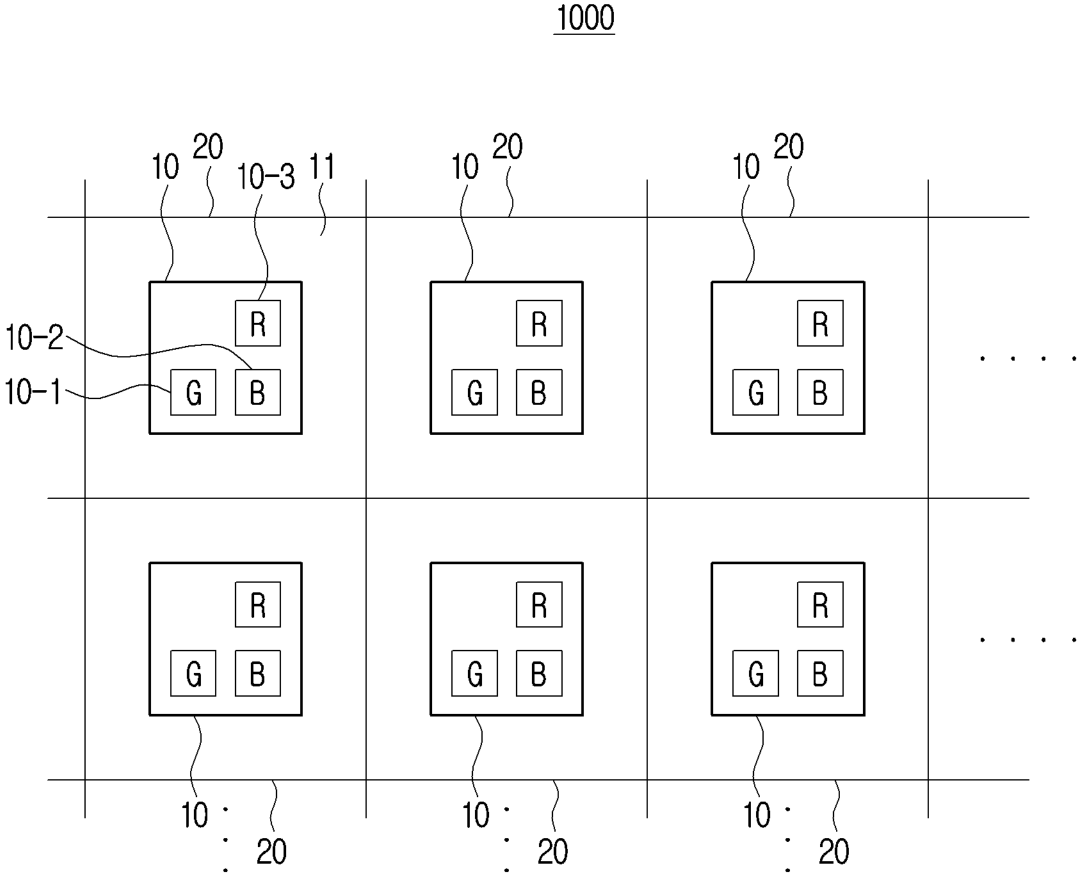
FIG. 1 is a diagram illustrating a pixel structure of a display panel according to an embodiment of the disclosure.

First, terms used in this specification will be described briefly, and then the disclosure will be described in detail. Meanwhile, in explaining the disclosure, detailed explanation regarding related known technologies may be omitted, and overlapping explanation of the same components will be omitted as much as possible.

As terms used in the embodiments of the disclosure, general terms that are currently used widely were selected as much as possible, in consideration of the functions described in the disclosure. However, definitions of the terms may vary depending on the intention of those skilled in the art who work in the pertinent technical field or previous court decisions, emergence of new technologies, etc. Also, in particular cases, there may be terms that were arbitrarily designated by the applicant, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

In addition, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents, or alternatives included in the idea and the technical scope disclosed herein. Meanwhile, in explaining the embodiments, in case it is determined that detailed explanation of related known technologies may unnecessarily confuse the gist of the disclosure, the detailed explanation will be omitted.

Further, terms such as “first,” “second,” and the like may be used to describe various components, but the components are not intended to be limited by the terms. The terms are used only to distinguish one component from another component. For example, a first component may be called a second component, and a second component may be called a first component in a similar manner, without departing from the scope of the disclosure.

Also, singular expressions include plural expressions, as long as they do not obviously mean differently in the context. In addition, in the disclosure, terms such as “include” and “consist of” should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, “a module” or “a part” performs at least one function or operation, and may be implemented as hardware or software, or as a combination of hardware and software. Also, a plurality of “modules” or “parts” may be integrated into at least one module and implemented as at least one processor, except “modules” or “parts” which need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Further, while the embodiments of the disclosure will be described in detail below with reference to the accompanying drawings and the contents described in the accompanying drawings, it is not intended that the disclosure is restricted or limited by the embodiments.

One purpose of the disclosure is to provide a display panel in which color reproducibility is improved, as it includes driving circuits that control LED elements to operate stably.

Another purpose of the disclosure is to provide a display panel which includes driving circuits appropriate for high-density integration by optimizing the design of driving circuits driving LED elements arranged on a substrate.

Hereinafter, a display panel and a display device according to the disclosure will be described in detail with reference to FIG. 1 to FIG. 8.

FIG. 1 is a diagram illustrating a pixel structure of a display panel according to an embodiment of the disclosure.

Referring to FIG. 1, a display panel 1000 of a display device 1200 (shown in FIG. 5) according to an embodiment of the disclosure may include a plurality of pixels 10 arranged in the form of a matrix.

According to an embodiment, the display device 1200 may be implemented as an independent display panel 1000, or it may include the display panel 1000 implemented as an extendable display module of the display device 1200.

The display panel 1000 may include inorganic light emitting diodes (LED) or micro light emitting diodes (micro LEDs or μLEDs) as light emitting elements 200 (shown in FIG. 2), and may display images using the plurality of light emitting elements 200. According to an embodiment, the display panel 1000 consists of a plurality of inorganic light emitting diodes (inorganic LEDs), and thus it can provide better clarity and luminance than a liquid crystal display (LCD) panel which needs a backlight, and it can also reduce response time and improve energy efficiency.

The display panel 1000 according to certain embodiments may be installed and applied on wearable devices, portable devices, handheld devices, and electronic products or electronic components which need various kinds of displays in a single unit. Also, a plurality of display modules including display panels may be applied to various display devices such as monitors for personal computers (PCs), high resolution TVs and signage (or, digital signage), and electronic displays through a plurality of assembly arrangements as a matrix type.

The display panel 1000 may include a substrate 50 (shown in FIG. 3) where a plurality of light emitting elements 200 are arranged and a side surface wiring is formed. In the display panel 1000, a plurality of penetrating wiring members formed so as not to be exposed to a side surface of the substrate 50 are provided, and accordingly, an inactive area can be minimized and an active area can be maximized on the front surface of the TFT substrate 50, and thus the display panel 1000 can become bezel-less, and the arrangement density of micro LEDs for the display panel 1000 can be increased.

The display panel 1000 implementing a bezel-less structure may be implemented as a plurality of display modules, and the plurality of display modules may be connected, and the implemented multi display device 1200 can be large in size (e.g. on the order of several meters in diagonal) and can maximize the active area. In this case, in each display module, the inactive area is minimized, and accordingly, intervals (pitches) between adjacent pixels of different display modules may be the same as intervals (pitches) between adjacent pixels in the same display module. Accordingly, generation of seams when connecting the separate display modules can be prevented.

According to an embodiment, the display panel 1000 may include a plurality of pixels 10 arranged in the form of a matrix, and each pixel 10 may include a plurality of sub-pixels 10-1 to 10-3. For example, each of the plurality of pixels 10 may include three sub-pixels 10-1 to 10-3 consisting of a red (R) sub-pixel 10-3, a green (G) sub-pixel 10-1, and a blue (B) sub-pixel 10-2. That is, one set of the R, G, and B sub-pixels 10-1 to 10-3 may constitute one unit pixel 10 of the display panel 1000.

In general, the order of the sub-pixels 10-1 to 10-3 is described as R, G, and B, but the sub-pixels are not actually arranged in the order of R, G, and B in the pixel 10, and in the disclosure, in explaining the plurality of sub-pixels 10-1 to 10-3 or the plurality of light emitting elements 200-1 to 200-3 (refer to FIG. 3), the order of R, G, and B is used in the description solely as an example. This is for the convenience of explanation, and in actuality, the order that elements such as light emitting elements and driving circuits are arranged may be identical to or different from what is shown in the figures and described herein.

In the display panel 1000, one pixel area 20 may include an area occupied by the pixel 10, and the surrounding remaining area 11. Specifically, in the area occupied by the pixel 10, the R, G, and B sub-pixels 10-1 to 10-3 may be included as illustrated, and here, the R sub-pixel 10-3 may include the R light emitting element 200-3 (shown in FIG. 3) and a third driving circuit 301-3 (shown in FIGS. 4A-4D) for driving the R light emitting element 200-3, and the B sub-pixel 10-2 may include the B light emitting element 200-2 (shown in FIG. 3) and a second driving circuit 301-2 (shown in FIGS. 4A-4D) for driving the B light emitting element 200-2, and the G sub-pixel 10-1 may include the G light emitting element 200-1 (shown in FIG. 3) and a first driving circuit 301-1 (shown in FIGS. 4A-4D) for driving the G light emitting element 200-1.

According to an embodiment, in the surrounding remaining area 11 of the pixel area 20 occupied by the pixel 10, the first to third driving circuits 301-1 to 301-3 and another driving circuit (refer to FIG. 5) for driving them may be included.

According to an embodiment, in one pixel 10, the sub pixels 10-1 to 10-3 may be arranged in the shape of a reverse "L". However, the disclosure is not limited thereto, and the R, G, and B sub-pixels 10-1 to 10-3 may be arranged in a row inside the pixel 10, or the plurality of sub-pixels 10-1 to 10-3 may be arranged in various shapes in each pixel 10.

Meanwhile, in the aforementioned embodiment, it was explained that the pixel 10 consists of three kinds of sub-pixels 10-1 to 10-3, but the disclosure is not limited thereto, and the pixel 10 may be implemented as four kinds of sub-pixels such as R, G, B, and W (white), or sub-pixels in different numbers may constitute one pixel. Hereinafter, for the convenience of explanation, explanation will be made based on an example where the pixel 10 consists of three kinds of sub-pixels such as R, G, and B.

Figure 2:
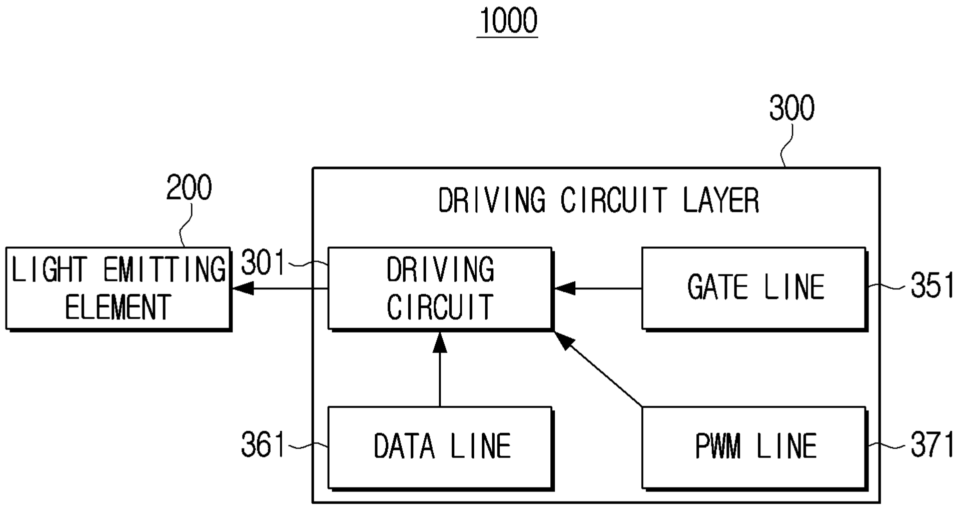
FIG. 2 is a block diagram of a display panel according to an embodiment of the disclosure.

FIG. 2 is a block diagram of a display panel according to an embodiment of the disclosure.

Referring to FIG. 2, the display panel 1000 according to an embodiment may include light emitting elements 200 and a driving circuit layer 300.

The display panel 1000 may include a plurality of light emitting elements 200 constituting the plurality of sub-pixels 10-1 to 10-3, and a plurality of driving circuits 301 for driving each light emitting element 200.

According to an embodiment, the display panel 1000 may include a substrate 50, and the substrate 50 may be made of a backplane 305 and the driving circuit layer 300. On the driving circuit layer 300, the light emitting elements 200 may be arranged. This structure will be described in detail below with reference to FIG. 3.

The light emitting elements 200 may constitute the sub-pixels 10-1 to 10-3 of the display panel 1000, and it may emit light based on the driving of the driving circuit 301 of the driving circuit layer 300. There may be a plurality of types of light emitting elements 200 for various colors of light, and the light emitting elements 200 may include a red (R) light emitting element emitting red light, a green (G) light emitting element emitting green light, and a blue (B) light emitting element emitting blue light.

According to the type of the light emitting elements 200, the types of the sub-pixels 10-1 to 10-3 of the display panel 1000 may be determined. The light emitting elements 200 according to an embodiment of the disclosure may be LED elements, and more particularly, they may be micro LED elements. That is, a G-light emitting element may constitute a G sub-pixel 10-1, a B-light emitting element may constitute a B sub-pixel 10-2, and an R-light emitting element may constitute an R sub-pixel 10-3. Here, the G-light emitting element may be the first light emitting element 200-1, the B-light emitting element may be the second light emitting element 200-2, and the R-light emitting element may be the third light emitting element 200-3.

Organic light emitting diodes (organic LEDs) and micro LEDs, which are inorganic light emitting diodes, all have good energy efficiency, but micro LED has an advantage in that it has better brightness and light emitting efficiency, and longer lifespan than OLED. To be specific, micro LED is a semiconductor chip that can emit a light by itself when power is supplied, and micro LED may have fast reaction speed, low power consumption, and high luminance. For example, micro LED has higher efficiency in converting electrons to photons compared to conventional liquid crystal display (LCD) or organic light emitting diode (OLED). That is, micro LED has higher 'brightness per watt' compared to conventional LCD or OLED display. Accordingly, micro LED can output the same brightness even with approximately half the energy compared to conventional LED or OLED. In addition, micro LED can implement high resolution, and superior colors, contrast, and brightness, and can thus express colors in a wide range precisely, and can clearly output content even in the outdoors settings where bright sunlight can obscure images displayed on a display. Also, micro LED is resistant against bum-in and emits a small amount of heat, and thus it has relatively long lifespan. Micro LED may have a flip chip structure where anode and cathode electrodes 3, 4 are formed on the same first surface, and a light emitting surface is formed on a second surface located on the opposite side of the first surface where the electrodes are formed.

The light emitting elements 200 of the display panel 1000 and the display device 1200 according to an embodiment of the disclosure may be LED elements or micro LED elements, and hereinafter, they will be described as "light emitting elements 200."

The substrate 50 may include the driving circuit layer 300, and the driving circuit layer 300 may include various kinds of circuits for driving the light emitting elements 200. For example, the driving circuit layer 300 may include a driving circuit 301 for driving the light emitting elements 200, and may include a gate line 351 and a data line 361 (shown in FIG. 5) for controlling the driving circuit 301. According to an embodiment, when at least some of the driving circuits 301-1 are driven using the pulse width modulation (PWM) technique, the driving circuit layer 300 may further include a PWM line 371 connected to the first driving circuit 301-1.

The driving circuit 301 may drive the light emitting elements 200 so that the sub-pixels 10-1 to 10-3 outputs light gradations. As described above, in the display panel 1000, the plurality of light emitting elements 200-1 to 200-3 may be implemented as sub-pixels 10-1 to 10-3. Thus, unlike in a liquid crystal display (LCD) panel that uses a plurality of LED light sources emitting a single color (e.g. white) as backlights, the driving circuit 301 may drive the plurality of light emitting elements 200 so that the sub-pixels 10-1 to 10-3 outputs light gradations.

To individually drive the sub-pixels 10-1 to 10-3, each sub-pixel 10-1 to 10-3 included in the display panel 1000 may be implemented as the plurality of light emitting elements 200 and the driving circuit 301 for driving the plurality of light emitting elements 200-1 to 200-3. That is, the first driving circuit to the third driving circuit 301-1 to 301-3 for driving each of the plurality of light emitting elements 200-1 to 200-3 may exist for each sub-pixel in the driving circuit layer 300.

For example, the first driving circuit 301-1 may be formed correspondingly to the G sub-pixel 10-1, the second driving circuit 301-2 may be formed correspondingly to the B sub-pixel 10-2, and the third driving circuit 301-3 may be formed correspondingly to the R sub-pixel 10-3, and they may be used to drive the light emitting elements 200-1 to 200-3 in each sub-pixel 10-1 to 10-3.

Thus, the first to third light emitting elements 200-1 to 200-3 may constitute one pixel 10, and the first to third light emitting elements 200-1 to 200-3 may be implemented as individual light emitting elements, and in a corresponding manner thereto, the first to third driving circuits 301-1 to 301-3 may also exist as a plurality of individual driving circuits. Accordingly, each pixel 10 may be arranged in the form of a matrix, and a plurality of pixels may be implemented.

The pixel driving method of the driving circuit 301 may be an active matrix (AM) or a passive matrix (PM) driving method. On the substrate 50, the pattern of the wiring where each light emitting element 200 is electronically connected may depend on whether the AM driving method or the PM driving method is used.

The driving circuit 301 may drive the plurality of light emitting elements 200 by using a pulse amplitude modulation (PAM) method controlling an amplitude of a driving current or by using a pulse width modulation (PWM) method controlling an amplitude and a pulse width of the driving current.

According to an embodiment, in one pixel area 20, a plurality of PAM driving circuits may be arranged, and each sub pixel 10-1 to 10-3 arranged in the one pixel area 20 may be controlled by a corresponding PAM driving circuit. Alternatively, in the one pixel area 20, a plurality of PWM driving circuits may be arranged, and each sub-pixel 10-1 to 10-3 arranged in the one pixel area 20 may be controlled by a corresponding PWM driving circuit.

In the one pixel area 20, PAM driving circuits and PWM driving circuits may be arranged together. Some of the sub-pixels 10-1, 10-2, 10-3 arranged in the one pixel area 20 may be controlled by the PAM method, and the remaining sub-pixels may be controlled by the PWM method. Also, a single sub pixel 10-1, 10-2, or 10-3 may be controlled by both a PAM driving circuit and a PWM driving circuit. According to an embodiment, at least one of the sub-pixels 10-1, 10-2, 10-3 may be controlled by a control circuit that can use both of the PAM method and the PWM method, i.e., a PWM-PAM combined driving circuit. The PWM-PAM combined driving circuit may be implemented as a circuit structure different a circuit structure resulting from simply combining a PAM driving circuit and a PWM driving circuit.

Thus, according to an embodiment, the driving circuit 301 may include the first to third driving circuits 301-1 to 301-3, and the first driving circuit 301-1 may include a PWM driving circuit or a PWM-PAM combined driving circuit, and perform control to drive the first light emitting element 200-1 which is a part of the plurality of light emitting elements 200 by the PWM method or the PWM-PAM combined method. The second and third driving circuits 301-2, 301-3 may not include a PWM driving circuit but include a PAM driving circuit, and perform control to drive the second and third light emitting elements 200-2, 200-3, which are parts of the plurality of light emitting elements 200 other than the first light emitting element 200-1, by the PAM method.

Hereinafter, for the convenience of explanation, explanation will be made based on an embodiment where the first driving circuit 301-1 includes a PWM driving circuit and performs control by using the PWM driving method, and each of the second to third driving circuits 301-2, 301-3 includes a PAM driving circuit and performs control by using the PAM driving method, but in actual implementation, the disclosure is not limited thereto. For example, according to an embodiment, the first driving circuit and the third driving circuit 301-1, 301-3 may perform control to drive the first light emitting element and the third light emitting element 200-1, 200-3, which are parts of the plurality of light emitting elements 200, by using the PWM method or the PWM-PAM combined method, and the second driving circuit 301-2 may perform control to drive the second light emitting element 200-2, which is another part of the plurality of light emitting elements 200, by using the PAM method.

For implementing the PAM driving method, each of the second and third driving circuits 301-2, 301-3 may be connected to the gate line 351 and the data line 361. The second and third driving circuits 301-2, 301-3 may receive a gate signal and a data signal from the gate line 351 and the data line 361, and if the gate signal is on, the driving circuits may control the amplitude of the driving power provided to each of the second and third light emitting elements 200-2, 200-3 based on the received data signal. Thus, each of the second and third driving circuits 301-2, 301-3 may perform control such that, even if the gradation of each of the second and third light emitting elements 200-2, 200-3 is changed, the length of the light emitting period is maintained without being changed.

For implementing the PWM driving method or the PWM-PAM combined method, the first driving circuit 301-1 may be connected to the gate line 351 and the data line 361, and the PWM line 371. The first driving circuit 301-1 may receive a gate signal, a data signal, and a PWM signal from each of the gate line 351, the data line 361, and the PWM line 371, and if the gate signal is on, the first driving circuit 301-1 may simultaneously control the amplitude and the pulse width of the driving power provided to the first light emitting element 200-1 based on the received data signal and the received PWM signal. Thus, the first driving circuit 301-1 may perform control such that the length of the light emitting period is changed as the gradation of each first light emitting element 200-1 is changed.

Referring to FIG. 2, the driving circuit 301 according to an embodiment may be connected with a data driving part 820 (refer to FIG. 5) via the data line 361, and may be connected with a gate driving part 830 (refer to FIG. 5) via the gate line 351. According to an embodiment, the first driving circuit 301-1 controlling using the PWM driving method or the PWM-PAM combined method may be additionally connected with the gate driving part 830 via the PWM line 371. Regarding the connecting structure with the driving circuit 301 in the display device 1200, detailed explanation will be made with reference to FIG. 5 to FIG. 6.

As the PWM driving method is a method of expressing gradation according to the light emitting time of the light emitting elements 200, the first driving circuit 301-1 may drive the first light emitting element 200-1 by the PWM method, and even if the amplitude of the driving current is the same, the first driving circuit 301-1 may vary the light emitting time and express various gradations.

According to an embodiment, in some light emitting elements 200-1 in the light emitting elements 200, e.g., the light emitting element 200-1 which is a G-light emitting element, color shift may occur by a change in the electric current, unlike in the other light emitting elements 200-2, 200-3. In this case, the first driving circuit 301-1 may control the driving of the first light emitting element 200-1 so as to correspond to the degree of the color shift according to the gradation of the second light emitting element 200-2 or the third light emitting element 200-3 controlled by the second driving circuit 301-2 or the third driving circuit 301-3. That is, the driving circuit 301 according to an embodiment of the disclosure may drive the light emitting element 200-1, by the PWM method or the PWM-PAM combined driving method, such that color transition phenomenon occurs due to color shift, and thus the problem that a wavelength of light emitted by some light emitting elements 200-3 is changed according to the gradation can be resolved.

The gate line 351 may control the driving circuit 301 by transmitting a gate signal from the gate driving part 830 (refer to FIG. 5) to the driving circuit 301. The PWM line 371 may control the driving circuit 301 by transmitting a PWM signal from the gate driving part 830 to the driving circuit 301, and only some driving circuits 301-1 in the driving circuits 301 using the PWM driving method may receive the PWM signal. That is, the gate driving part 830 may generate a control signal for the operation of the driving circuit 301, and provide the signal to the driving circuit 301 through the gate line 351 and the PWM line 371.

For example, the gate driving part 830 may respectively generate control signals for driving a PAM driving circuit or a PWM driving circuit included in the driving circuit 301, and respectively provide the signals to the PAM driving circuit or the PWM driving circuit.

The data line 361 may transmit data signals from the data driving part 820 (refer to FIG. 5) to the driving circuit 301. The data driving part 820 may receive image data in R/G/B components from the processor 900 and generate data signals (e.g., signals indicating specific voltage, amplitude setting voltage, and/or pulse width setting voltage), and provide the signals to the driving circuit 301 through the data line 361.

Figure 3:
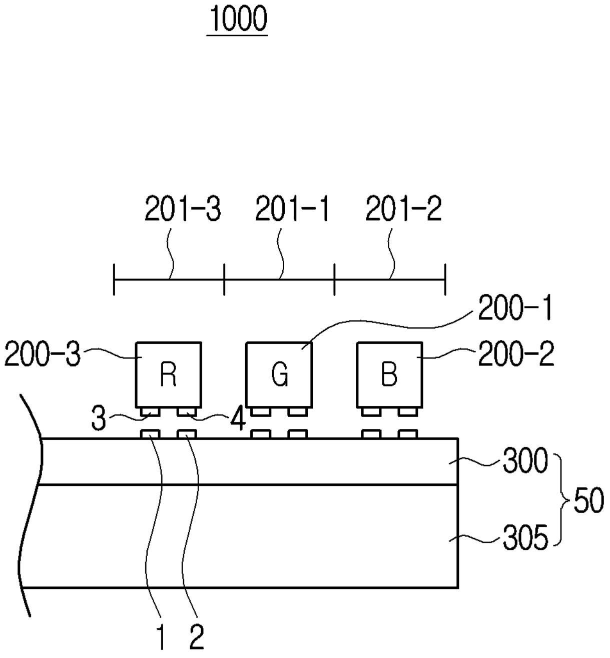
FIG. 3 is a cross-sectional diagram of a display panel according to an embodiment of the disclosure.

FIG. 3 is a cross-sectional diagram of a display panel according to an embodiment of the disclosure.

Referring to FIG. 3, the display panel 1000 according to an embodiment may include a substrate 50 and a plurality of light emitting elements 200-1 to 200-3.

According to an embodiment, on the front surface of the backplane 305 of the substrate 50 of the display panel 1000, a TFT layer implemented in a form of a thin film transistor (TFT) circuit may be arranged. The TFT layer may be a driving circuit layer 300 where the driving circuit 301 is implemented in a form of the TFT circuit. On the rear surface of the backplane 305, a power supply circuit (not shown) supplying power to the driving circuit 301 and the data driving part 820, the gate driving part 830, and the timing controller 810 controlling each driving circuit may be arranged.

According to another embodiment, on the front surface of the backplane 305 of the substrate 50, a driving circuit layer 300 where the driving circuit 301 is formed may be arranged, and on the rear surface of the backplane 305, additional circuits may not be arranged. Alternatively, a TFT layer may be made to be integrated with the backplane 305 or be manufactured first as a separate film, and subsequently attached on one surface of the backplane 305.

The front surface of the backplane 305 of the substrate 50 may be divided into an active area and an inactive area. The active area may correspond to an area occupied by the TFT layer on the front surface of the backplane 305, and the inactive area may be an area excluding the area occupied by the TFT layer on the front surface of the backplane 305.

FIG. 3 illustrates coupling of one pixel included in the substrate 50 for the convenience of explanation, and referring to FIG. 3, the substrate 50 according to an embodiment may consist of the backplane 305 and the driving circuit layer 300 arranged on the front surface of the backplane 305.

The driving circuit layer 300 may be formed on the top surface of the backplane 305, and each of the plurality of light emitting elements 200-1 to 200-3 may be arranged on the driving circuit layer 300 and constitute each of the sub-pixels 10-1 to 10-3 of the display panel 1000.

Each of the first to third light emitting elements 200-1 to 200-3 may emit first to third colors different from one another, and the first to third colors may include at least one of green, red, or blue. Taking LED elements for example, the first light emitting element 200-1 according to an embodiment may be a green (G) LED element, the second light emitting element 200-2 may be any one of a red (R) LED element or a blue (B) LED element, and the third light emitting element 200-3 may be the other one of the red (R) LED element or the blue (B) LED element different from the second light emitting element 200-2. Through this, the first to third light emitting elements 200-1 to 200-3 may constitute one pixel 10. However, the disclosure is not limited thereto, and the first light emitting element 200-1 according to another embodiment of the disclosure may be any one of a G LED element, a B LED element, or an R LED element, and the second to third light emitting elements 200-2, 200-3 may be implemented as LED elements which are different from the first light emitting element 200-1 and which are different from each other but selected from the G LED element, the B LED element, and the R LED element.

The driving circuit layer 300 may be implemented using thin film transistors (TFTs) and constitute a TFT layer. In this case, the driving circuit layer 300 formed on the backplane 305 and the backplane 305 may together be referred to as a TFT panel or a backplane substrate.

On the driving circuit layer 300, the driving circuit 301 for driving each of the first to third light emitting elements 200-1 to 200-3 may exist for each of the first to third light emitting elements 200-1 to 200-3, and each of the first to third light emitting elements 200-1 to 200-3 may respectively be arranged on the driving circuit layer 300 so as to be electronically connected with the corresponding first to third driving circuits 301-1 to 301-3.

Specifically, the first light emitting element 200-1 may be arranged such that an anode electrode 3 and a cathode electrode 4 of the first light emitting element 200-1 are respectively connected to an anode electrode 1 and a cathode electrode 2 formed on the first driving circuit 301-1 for driving the first light emitting element 200-1, and this is the same in the second to third light emitting elements 200-2, 200-3. According to the various embodiments, any one of the anode electrode 1 or the cathode electrode 2 may be implemented as a common electrode.

FIG. 3 illustrates an example where the plurality of light emitting elements 200-1 to 200-3 are micro LEDs of a flip chip type, and according to an embodiment, the plurality of light emitting elements 200-1 to 200-3 may be micro LEDs of lateral type or vertical type.

In the disclosure, the TFT of the TFT layer (or a backplane) corresponding to the driving circuit layer 300 is not limited to a specific structure or type. For example, the TFT cited in the disclosure may be implemented as an oxide TFT and an Si TFT (poly silicon, a-silicon), an organic TFT, and a graphene TFT rather than a low-temperature polycrystalline silicon TFT (LTPS TFT). Also, only a p-type (or an n-type) MOSFET may be made in an Si wafer CMOS process and applied.

Although not illustrated in the drawings, hereinafter, a process where micro LEDs that are light emitting elements 200 are transferred to the substrate 50 will be described.

A substrate (or a wafer) may include an epi layer (not shown) in a monocrystalline substrate. This monocrystalline substrate used as a base material here. The epi layer (not shown) may be formed through a process of growing monocrystalline thin film on the monocrystalline substrate, which again is a base material. In such an epi process, a compound semiconductor is grown by using metal organic chemical vapor deposition (MOCVD) equipment on a base material substate. For example, in the epi process for blue LED, an n-type semiconductor (n-GaN) and an active layer (InGaN), capable of light emission, and a p-type semiconductor (p-GaN) are sequentially deposited on a sapphire or SiC substrate.

A relay substrate may be a substrate where a plurality of LEDs are transferred from an epi substrate and arranged to have specific pitches in an X direction and a Y direction. The relay substrate (not shown) may also be referred to as a temporary substrate. Also, a process of separating micro LEDs from the substrate and aligning them on the relay substrate (or the temporary substrate) or an interposer (or an interposer substrate) may be referred to as an interposer process. In addition, an operation of moving the micro LEDs on the relay substrate on a substrate of the display panel may be referred to as a transfer process.

A target substrate is a substrate where a thin film transistor (TFT) layer and a plurality of electronic elements are arranged on one surface, and a plurality of LEDs may be transferred from the relay substrate. Also, the target substrate may be referred to as a display substrate. The target substrate where the plurality of LEDs are transferred may constitute a unit display module. An interval in an X axis direction (or a row direction) and an interval in a Y axis direction (or a column direction) among adjacent LEDs arranged on the relay substrate may be referred to as chip pitches.

A chip pitch may be the distance from one side end of one LED to one side end of the most adjacent LED in the X axis direction or the Y axis direction. Also, a chip pitch may be the distance from the center of one LED to the center of the most adjacent LED in the X axis direction or the Y axis direction.

An interval in the X axis direction and an interval in the Y axis direction among adjacent LEDs arranged on the target substrate may be referred to as pixel pitches. Here, a pixel pitch corresponds to the final pitch between each LED applied to the display module, and thus it may also be referred to as a display pitch. The pixel pitch (or the display pitch) of the target substrate may be maintained as an interval bigger than the chip pitch of the relay substrate.

The display pitch and the pixel pitch may be a distance from one side end of one pixel (here, a pixel may consist of at least two sub-pixels (LEDs)) to one side end of the most adjacent pixel in the X axis direction or the Y axis direction. Also, the display pitch and the pixel pitch may be a distance from the center of one pixel to the center of the most adjacent pixel in the X axis direction or the Y axis direction.

According to an embodiment, the backplane 305 may include glass, printed circuit board (PCB), or silicon wafer.

Referring to FIG. 3, the plurality of light emitting areas 201-1 to 201-3 of the top surface of the substrate 50 may be light emitting areas where each of the plurality of light emitting elements 200-1 to 200-3 is arranged on the substrate 50 and can be driven to emit light. In this case, the structures and the shapes of the plurality of light emitting elements 200-1 to 200-3 may be different from one another.

According to an embodiment, as illustrated in FIG. 3, the sizes and shapes of the plurality of light emitting areas 201-1 to 201-3 may be the same in the direction of the top surface of the substrate 50. Referring to FIG. 4A to FIG. 4D that will be described below, the areas occupied by the first to third driving circuits 302-1 to 302-3 may be identical to or different from the areas 201-1 to 201-3 where each of the plurality of light emitting elements 200-1 to 200-3 is arranged on the substrate 50 to emit light.

FIG. 4A to FIG. 4D are diagrams illustrating various arrangements of driving circuits according to certain embodiments of the disclosure.

To be specific, FIG. 4A to FIG. 4D are diagrams illustrating various embodiments of areas wherein the first driving circuit 301-1, the second driving circuit 301-2, and the third driving circuit 301-3 are arranged in an area 20 of one pixel of the driving circuit layer 300 of the substrate 50. The areas shown in FIG. 4A to FIG. 4D may not refer to the actual structural arrangements of the first to third driving circuits 301-1 to 301-3, but rather the ratio of the areas of the first to third driving circuits 301-1 to 301-3.

Referring to FIG. 4A to FIG. 4D, in the substrate 50 according to certain embodiments, the arrangements of the plurality of driving circuits 301-1 to 301-3 may be implemented in various ways in one area 20 shown in FIG. 1 occupied by one pixel.

According to certain embodiments, in the arrangement areas shown in FIG. 4A to FIG. 4D, the boundaries of the areas occupied by the respective driving circuits 301 are visually divided and displayed, and in particular, the areas may be areas wherein main circuit structures such as the transistors of the respective driving circuits 301 are arranged. But in actual implementation, the boundaries of the driving circuits 301 may not be straight lines. Also, the anode electrodes 1, 3 and the cathode electrodes 2, 4of the light emitting elements 200 are connected with the driving circuit layer 300, and thus the locations of the light emitting elements 200 may be independent from the arrangements of the driving circuits 301.

In the driving circuit layer 300, the pixel area 20 occupied by one pixel may include areas wherein the first to third driving circuits 301-1 to 301-3 for driving each of the R, G, and B sub-pixels 10-1 to 10-3 are arranged and the surrounding remaining area 11 (refer to FIG. 1). The data driving part 820, the gate driving part 830, and the timing controller 810 implemented in the TFT layer may be disposed in the remaining area 11. Alternatively, at least some of the first to third driving circuits 301-1 to 301-3 may be arranged in the remaining area 11. In the one pixel area 20, the size of the area occupied by the driving circuits 301 may be about ¼ of the one pixel area 20, but the size is not limited thereto, and the area may occupy a bigger area.

Figure 4A:
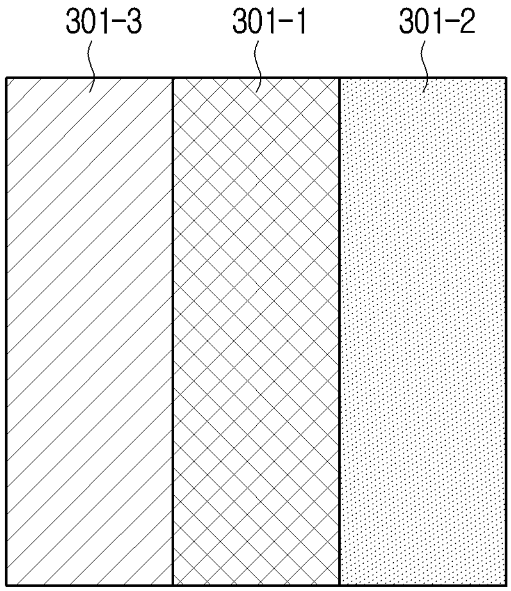
FIG. 4A is a diagram illustrating arrangement of driving circuits according to an embodiment of the disclosure.

Referring to FIG. 4A, in the substrate 50 according to an embodiment, the areas occupied by the first to third driving circuits 301-1 to 301-3 in the area 20 occupied by one pixel may be homogenous. Here, the term "homogenous" here means that the areas are identical or similar within a technical implementation range, such that the term does not require complete identicalness.

The arrangement in FIG. 4A may be applied in case all of the plurality of driving circuits 301-1 to 301-3 are driven by one of the PAM method, the PWM method, or the PWM-PAM combined method, and in case at least some of the plurality of driving circuits 301-1 to 301-3 are driven by the PWM method, the arrangement may be applied if the areas occupied by the first to third driving circuits 301-1 to 301-3 are secured in the one pixel area 20 of the display panel 1000. In this case, the areas occupied by the respective light emitting areas 201-1 to 201-3 and the areas occupied by the respective first to third driving circuits 301-1 to 301-3 on the plurality of substrates 50 illustrated in FIG. 3 may correspond to one another in a homogenous manner.

According to an embodiment, the one pixel area 20 in the display panel 1000 may be restrictive. In particular, in case the display device is a small-size display device 1200 and has high pixels per inch (PPI), the areas occupied by the driving circuits 301 in the one pixel area 20 may be restricted.

As described above, in case the first driving circuit 301-1 includes a PWM driving circuit such that the first light emitting element 200-1 which is a part of the plurality of light emitting elements 200 is driven by the PWM method or the PWM-PAM combined method, the first driving circuit 301-1 may include more circuits than the second driving circuit 301-2 by the PAM driving method. In this case, the areas that the first driving circuit 301-1 needs to be more due to more circuit structures, and the areas occupied by the respective driving circuits 301 in the substrate 50 may become a problem. For example, for implementing PWM driving, the first driving circuit 301-1 may need more transistors compared to the other driving circuits 301-2, 301-3 driven by the PAM method (refer to the circuit diagram in FIG. 7). Accordingly, the space required by some driving circuits (301-1) in the restricted one pixel area 20 may be more than others, and thus it may be inappropriate to implement the PWM-PAM combined method for all sub pixels in a display device having high PPI.

For resolving this, in the display panel 1000 according to an embodiment of the disclosure, the entire driving circuits 301 are not driven by the PWM method, but for some light emitting elements 200-1 wherein color transition phenomenon occurs due to color shift, the driving circuits may be driven by the PWM method or the PWM-PAM combined method, and for the other light emitting elements 200-2, 200-3, the driving circuits may be driven by the PAM method only. Hereinafter, an arrangement structure in such a case will be described.

Figure 4B:
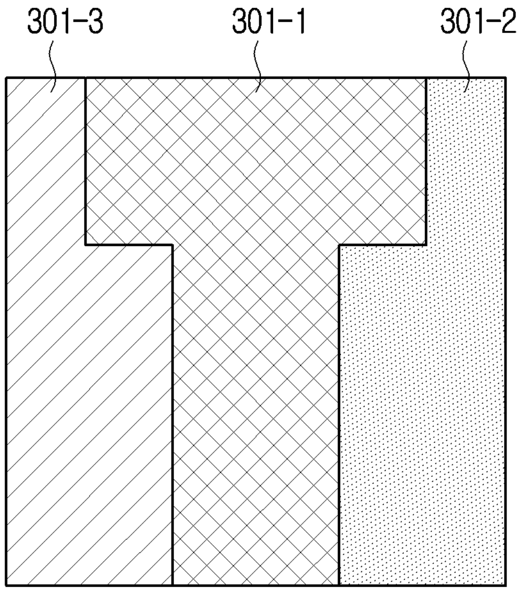
FIG. 4B is a diagram illustrating another arrangement of driving circuits according to an embodiment of the disclosure.

Referring to FIG. 4B, in the substrate 50 according to an embodiment, the first driving circuit 301-1 may occupy a bigger area than the second driving circuit 301-2 or the third driving circuit 301-3 in the area 20 occupied by one pixel.

As described above, the first driving circuit 301-1 is driven by the PWM method, and thus it may need a bigger space than the second and third driving circuits 301-2, 301-3 driven by the PAM method. Accordingly, the first driving circuit 301-1 may be arranged in some areas that were previously occupied by the second and third driving circuits 301-2, 301-3 in the homogeneous implementation of FIG. 4A, and as a result, the first driving circuit 301-1 may occupy a wider area than the second driving circuit 301-2 or the third driving circuit 301-3. Through such a structure, in case the display panel 1000 requires high PPI, and the areas occupied by the driving circuits 301 in the one pixel area 20 are restricted, even if extension of the space of the first driving circuit 301-1 is needed for driving some light emitting elements 200 by the PWM method, the areas that may be occupied by the driving circuits 301 in the one pixel area 20 may not be extended, and a color transition phenomenon of the display panel 1000 may be prevented.

In the area 20 occupied by one pixel, the first driving circuit 301-1 may be arranged in the center part, and the second driving circuit 301-2 and the third driving circuit 301-3 may be respectively arranged on either side of the first driving circuit 301-1. Such a structure is a modification of the homogeneous areas of FIG. 4A, and in the connection of the driving circuits 301 and the data line 361 and the gate line 351, the driving circuits may be arranged identically or similarly to the case of FIG. 4A. According to an embodiment, the area occupied by the first driving circuit 301-1 may overlap with at least some of the light emitting areas 201-2, 201-3 where the second light emitting element 200-2 and/or the third light emitting element 200-3 illustrated in FIG. 3 are arranged on the substrate 50. That is, on the substrate 50, the plurality of driving circuits 301-1 to 301-3 may be arranged independently from the light emitting areas 201-1 to 201-3 where the plurality of light emitting elements 200-1 to 200-3 are arranged, and in embodiments wherein the plurality of light emitting areas 201-1 to 201-3 are identical or homogeneous on the substrate 50, the areas occupied by the plurality of respective driving circuits 301-1 to 301-3 may be provided differently from one another according to the respective driving methods.

Figure 4C:
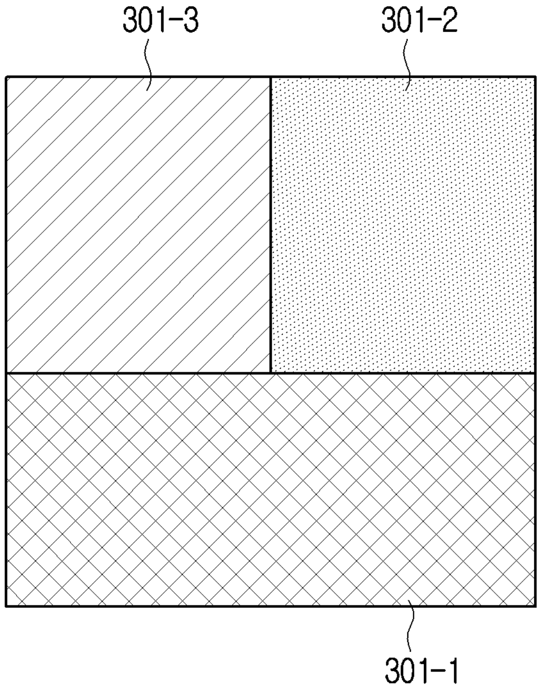
FIG. 4C is a diagram illustrating yet another arrangement of driving circuits according to an embodiment of the disclosure.

Referring to FIG. 4C, in the substrate 50 according to an embodiment, the second driving circuit 301-2 and the third driving circuit 301-3 may be arranged on the upper side in the area 20 occupied by one pixel, and the first driving circuit 301-1 may be arranged under the second driving circuit 301-2 and the third driving circuit 301-3.

The first driving circuit 301-1 may have an arrangement structure different from the second driving circuit 301-2 or the third driving circuit 301-3 to implement a circuit structure including transistors added for PWM driving, and the areas occupied by the respective driving circuits 301 in the area 20 occupied by one pixel may be different from one another.

Figure 4D:
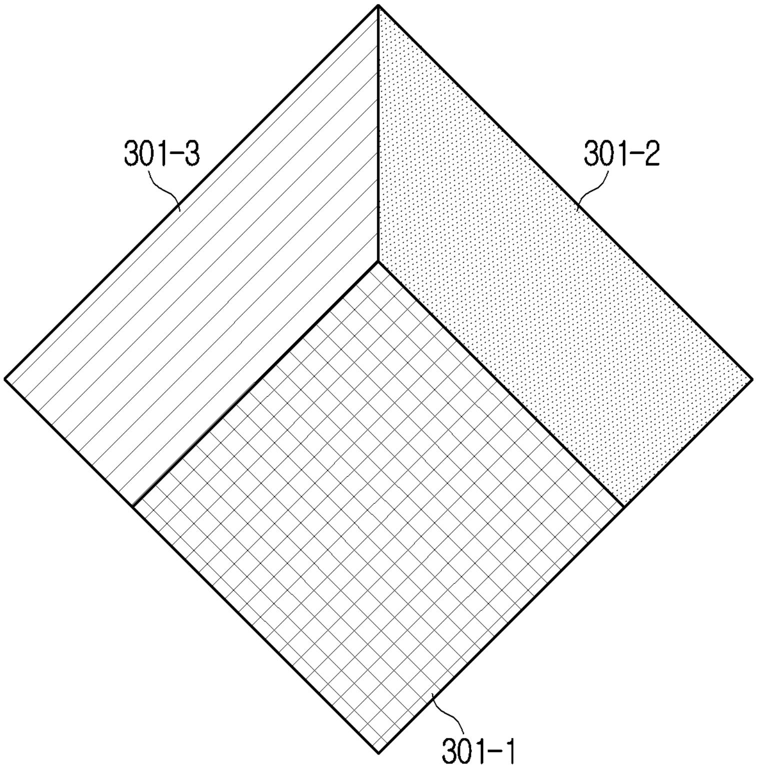
FIG. 4D is a diagram illustrating still another arrangement of driving circuits according to an embodiment of the disclosure.

Referring to FIG. 4D, in the substrate 50 according to an embodiment, the shape of the one pixel area 20 is not restricted to a square or a rectangle, and for example the shape may be a quadrilateral that is rotated by 90 degrees as compared to the embodiments shown in FIGS. 4A-4C. In this case, the second driving circuit 301-2 and the third driving circuit 301-3 may also be arranged on the upper side, and the first driving circuit 301-1 may be arranged under the second driving circuit 301-2 and the third driving circuit 301-3, and the first driving circuit 301-1 may occupy a wider area than the second driving circuit 301-2 or the third driving circuit 301-3.

According to certain embodiments, the area occupied by the first driving circuit 301-1 in FIG. 4C to FIG. 4D may overlap with at least some of the light emitting areas 201-2, 201-3 where the second light emitting element 200-2 and/or the third light emitting element 200-3 illustrated in FIG. 3 are arranged on the substrate 50, like in FIG. 4B.

Although not illustrated in the drawings, the areas where the plurality of driving circuits 301-1 to 301-3 are arranged in the pixel area 20 according to certain embodiments may be implemented in various shapes, and the areas may be divided asymmetrically, or their boundaries with the adjacent pixel area 20 may not be well defined. However, in such a case, the area occupied by the first driving circuit 301-1 may also be arranged to be wider than the other driving circuits 301-2, 301-3, and the technical advantages corresponding to the aforementioned structure can be expected. Ultimately, as the arrangement structures of the respective driving circuits 301 are changed as in the aforementioned embodiments, the display panel 1000 may drive the first driving circuit 301-1 by the PWM method while maintaining high PPI, and thereby prevent a color transition phenomenon of the display panel 1000.

Figure 5:
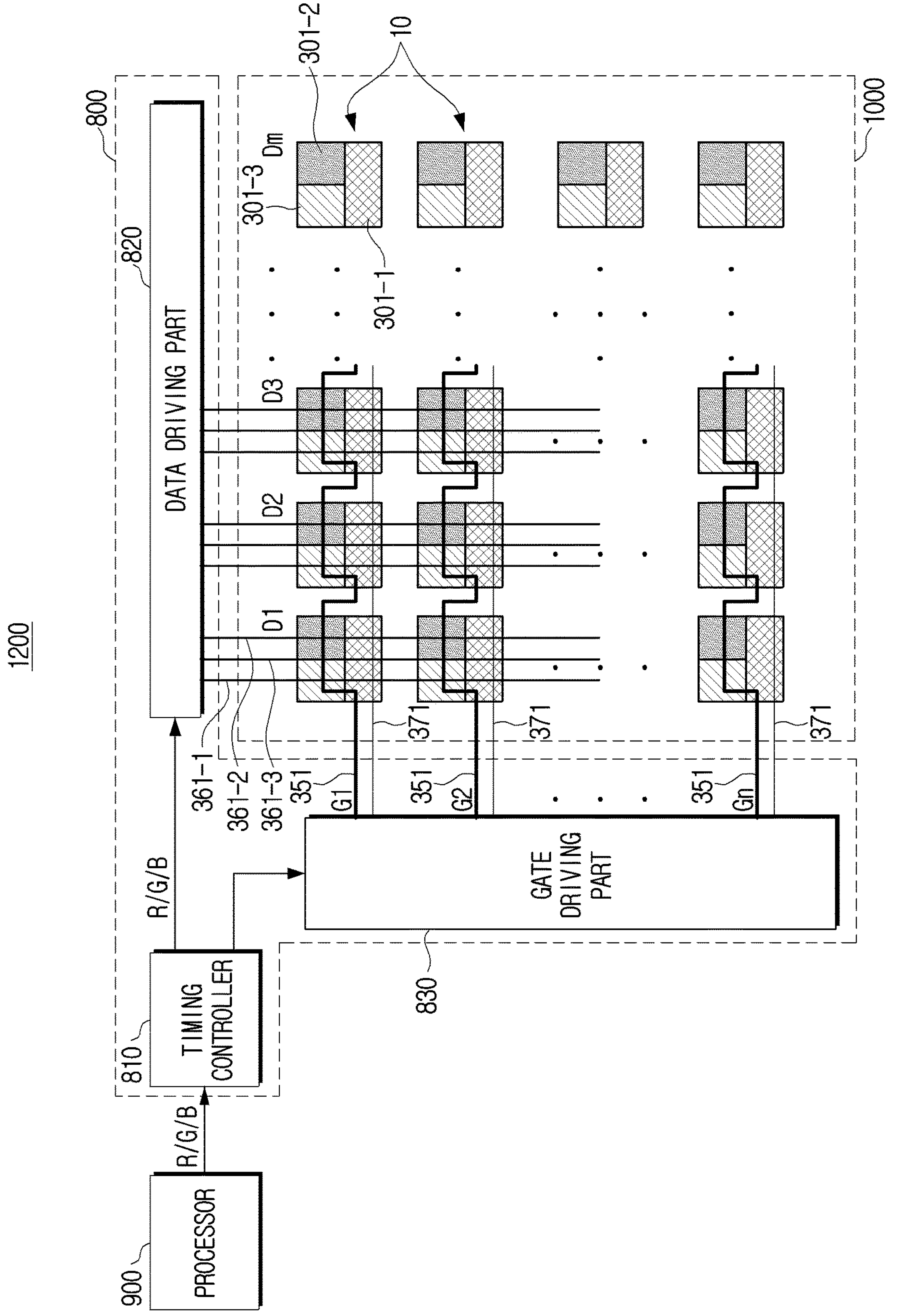
FIG. 5 is a block diagram of a display device according to an embodiment of the disclosure.

FIG. 5 is a block diagram of a display device according to an embodiment of the disclosure.

Referring to FIG. 5, a display apparatus 1200 according to an embodiment may include a display panel 1000, a panel driving part 800, and a processor 900.

The display panel 1000 may be arranged such that the plurality of gate lines 351 and the plurality of data lines 361 connected with the panel driving part 800 may be arranged to cross one another, and the driving circuits 301 may be formed in the areas wherein the gate lines 351 and the data lines 361 are provided to cross one another.

The panel driving part 800 may control the display panel 1000, and more specifically, driving of the plurality of respective driving circuits 301 according to control by the processor 900. According to an embodiment, the panel driving part 800 may be implemented as a display driver IC (DDI), and it may include a timing controller 810, a data driving part 820, and a gate driving part 830.

The timing controller 810 may receive inputs such as an input signal, a lateral synchronization signal, a vertical synchronization signal, and/or a main clock signal from an external component (e.g. the processor 900) and generate an image data signal, a scan control signal, a data control signal, and/or a light emission control signal, and provide the signals to the display panel 1000, the data driving part 820, and the gate driving part 830.

The timing controller 810 may apply at least one of a Ref control signal, a Sweep control signal, a RES control signal, or a MUX Sel R, G, B control signal to each of the plurality of driving circuits 301.

The data driving part 820 (or a source driver, a data driver) is a component configured to generate a data signal, and it may receive image data of R/G/B components from the processor 900 and generate a data signal (e.g., specific voltage, amplitude setting voltage, and pulse width setting voltage), and apply the generated data signal to the display panel 1000 through the data line 361.

The data line 361 may consist of one line, or it may include a first data line 361-1, a second data line 361-2, and a third data line 361-3 correspondingly to each of the first to third sub-pixels 10-1 to 10-3 as illustrated in FIG. 5. The first to third data lines 361-1 to 361-3 may be connected to the driving circuits 301 of the respective sub-pixels arranged in columns and/or rows or in matrix form in the pixel 10. There may be an M number of triplicates of data lines 361 from D1 to Dm when there are M number of columns of pixels.

The gate driving part 830 (or, a gate driver) is a component configured to generate various kinds of control signals such as a Sense control signal, an SPWM control signal, and a SPAM control signal, and it may transmit the generated various kinds of control signals to specific rows of the display panel 1000.

The plurality of gate lines 351 are lines for applying control signals to the plurality of first to third driving circuits 301-1 to 301-3 included in the display panel 1000, and in FIG. 5, one gate signal line for each row is illustrated, but each gate signal line may include a sense line (Sense 1 to Sense n) and a SPAM line (SPAM 1 to SPAM n).

The gate driving part 830 may generate a control signal for controlling turning-on/turning-off of a first driving transistor 311 (refer to FIG. 7) used to provide currents flowing in the driving circuits 301 to the outside through the data line 361, and provide the signal to the first driving transistor 311.

The gate driving part 830 may drive the pixels of the display panel arranged in a matrix form in units of lines. That is, the gate driving part 830 may drive the driving circuits 301 included in the display panel 1000 for each line by a method of driving the plurality of driving circuits 301 included in the sub-pixels constituting the pixels included in one line of the matrix, and then driving the plurality of driving circuits 301 included in the sub-pixels constituting the pixels included in the next line.

According to an embodiment, the gate driving part 830 may drive a plurality of pixels (or sub-pixels) in units of lateral lines (or units of rows) of the matrix. In the gate driving part 830, an area where control signals driving a PWM driving circuit and a PAM driving circuit of the driving circuits 301 are generated may be divided as a PWM/PAM driver, and an area where control signals controlling turning-on/turning-off of the first driving transistor 311 are generated may be divided as a Sense driver respectively.

The gate driving part 830 may be connected to the respective driving circuits 301 through the gate line 351, and transfer the aforementioned control signals. The gate line 351 may be connected to the driving circuits 301 of the respective sub-pixels in units of rows in the plurality of pixels 10 arranged in a matrix form. There may be an n number of gate lines 350 from G1 to Gn when there are n number of rows of pixels.

According to an embodiment, as illustrated in FIG. 5, the gate line 351 may be connected to all of the plurality of first to third driving circuits 301-1 to 301-3 of the plurality of R, G, and B sub-pixels 10-1 to 10-3 in rows of the matrix, and more specifically, the gate line 351 consisting of one line may commonly be connected to all of the first to third driving circuits 301-1 to 301-3.

In FIG. 5, the gate line 351 is illustrated in a bent shape for passing all of the areas wherein the first driving circuit to the third driving circuit 301-1 to 301-3 are arranged, but this is only used to illustrate that the gate line 351 is not connected to the data lines 361, for example, and it does not illustrate the actual structure of the display device. Also, according to another embodiment of the disclosure, the gate line 351 may be connected with a plurality of sub-gate lines (not shown), and each of the plurality of sub-gate lines (not shown) may be continuously connected with each of the first driving circuit to the third driving circuit 301-1 to 301-3.

In the first driving circuit 301-1 driven by the PWM method or the PWM-PAM combined driving method, an SPWM control signal is transferred from the gate driving part 830 through the PWM line 371 whose proceeding direction is identical to the gate line 351, and a pulse width setting voltage output from the data driving part 820 may be transferred through the data line 361.

Meanwhile, all or some parts of the data driving part 820 and the gate driving part 830 may be implemented to be included in the driving circuit layer 300 formed on one surface of the backplane 305 of the display panel 1000, or implemented as a separate semiconductor IC, and arranged on the other surface of the backplane 305.

The processor 900 may control the overall operations of the display device 1200. The processor 900 may drive the display panel 1000 by controlling the panel driving part 800, and thereby make the driving circuits 301 perform the aforementioned operations.

For this, the processor 900 may be implemented as one or more of a central processing unit (CPU), a micro-controller, an application processor (AP), or a communication processor (CP), and an ARM processor.

The processor 900 may provide an image signal to the display panel 1000. Specifically, the processor 900 may control the panel driving part 800, and set a pulse width of a driving current according to a pulse width setting voltage, and set an amplitude of the driving current according to an amplitude setting voltage.

In case the display panel 1000 is arranged as a matrix consisting of pixels in n number of rows and m number of columns, the processor 900 may control the panel driving part 800 to set the amplitude of the driving current to the driving circuits 301 for individual rows (or lateral lines), and also, set a pulse width for some driving circuits 301-1.

Afterwards, the processor 900 may apply a driving voltage (VDD) to the light emitting elements 200 through a current source of the plurality of driving circuits 301 included in the display panel 1000, and the first driving circuit 301-1 may control the panel driving part 800 such that a linear change voltage (a sweep voltage) is applied, and accordingly, an image may be displayed.

Here, the detailed description that the processor 900 controls the panel driving part 800 and thereby controls the operations of the driving circuits 301 included in the display panel 1000 may be similar to the above description.

Meanwhile, in the aforementioned embodiment, the processor 900 and the timing controller 810 were described as separate components, but the timing controller 810 may perform the function of the processor 900 without the processor 900.

So far, explanation was made in reference to an example where the light emitting elements 200 are micro LEDs or LED elements, but the disclosure is not limited thereto. Also, while explanation was made in reference to an example wherein the display panel 1000 is a chip on glass (COG) type, but in other embodiments, the driving circuits 301 according to the aforementioned embodiments of the disclosure may also be applied to a display panel of a chip on board (COB) type.

Meanwhile, according to an embodiment of the disclosure, the display panel 1000 may be implemented as an independent display panel 1000 without extensibility, or it may be implemented as an extendable display module constituting a part of a tiled display of a large area.

Figure 6:
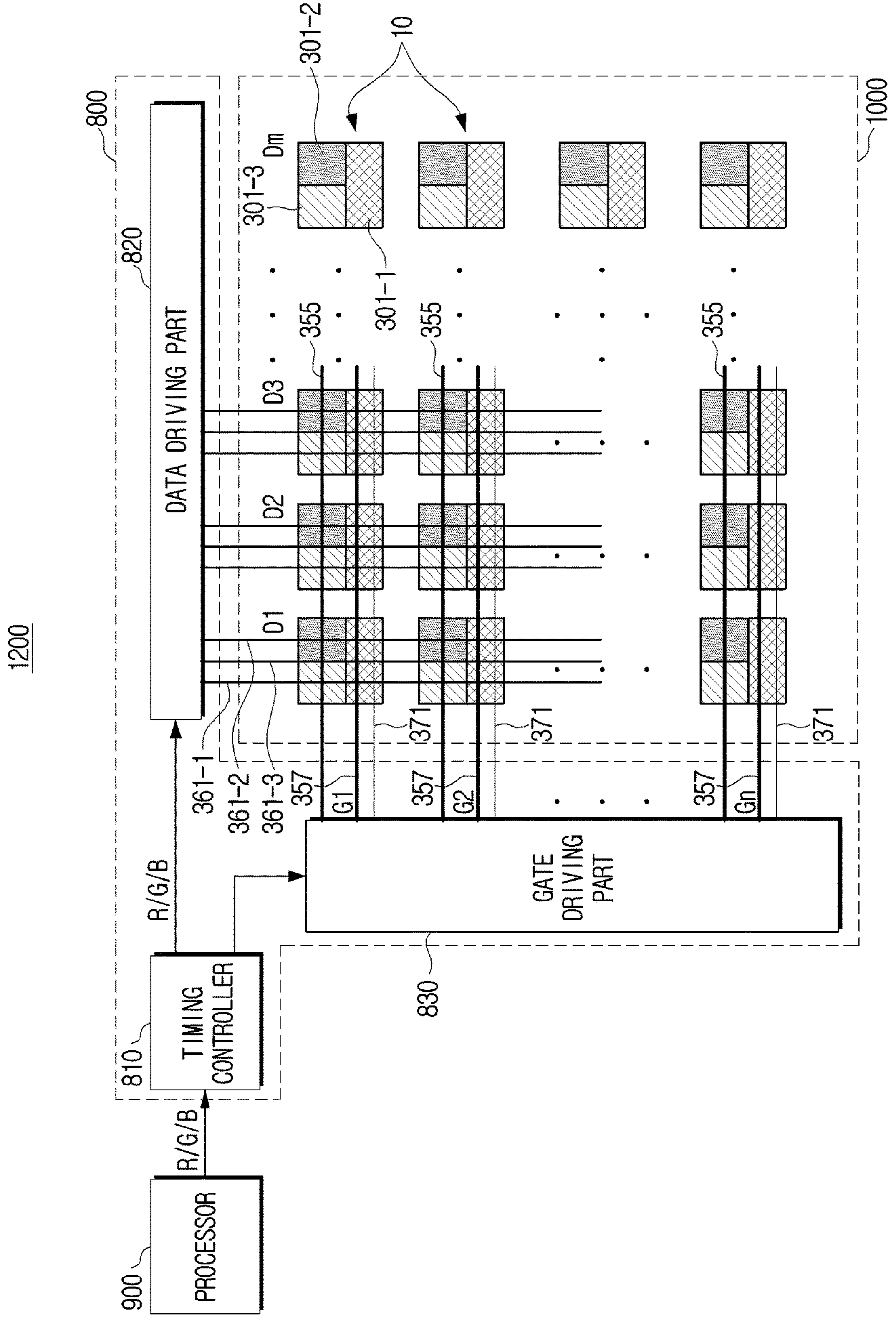
FIG. 6 is a block diagram of a display device according to an embodiment of the disclosure.

FIG. 6 is a block diagram of a display device according to an embodiment of the disclosure.

Referring to FIG. 6, the gate line 351 according to this embodiment may include a first gate line 355 and a second gate line 357.

In explaining FIG. 6, explanation will be omitted for structures in common with FIG. 5, and only differences in the arrangements of the first to second gate lines 355 and 357 will be explained.

According to an embodiment, the first gate line 355 may be connected to each of the plurality of second driving circuits 301-2 and the plurality of third driving circuits 301-3 of the plurality of R and B sub-pixels 10-2, 10-3 for each row of the matrix, and the second gate line 357 may be connected to each of the plurality of first driving circuits 301-3 of the plurality of G sub-pixels 10-1 for each row of the matrix.

According to an embodiment, one end of each of the first and second gate lines 355, 357 may be independently connected to the gate driving part 830, and the other end may proceed laterally, and each of the gate lines may be connected with the second and third driving circuits 301-2, 301-3 or the first driving circuit 301-1.

According to an embodiment, the first gate line 355 may include a plurality of sub-gate lines (not shown), and each of the plurality of sub-gate lines (not shown) may be connected to the plurality of second driving circuits 301-2 or the plurality of third driving circuits 301-3.

The second gate line 357 is connected to the first driving circuit 301-1 driven by the PWM method. Thus, the gate driving part 830 may control the first driving circuit 301-1 independently from the other driving circuits 301-2, 301-3 with the PWM line 371 and the second gate line 357.

According to the various embodiments of the disclosure as described above, changes of wavelengths according to the gradations of some light emitting elements 200-3 among the light emitting elements 200 included in the display panel 1000 can be prevented, and aberrations in color reproduction of the light emitting elements 200 constituting the display panel 1000 can be corrected.

Meanwhile, certain aspects of the various embodiments of the disclosure may be implemented as software including instructions stored in machine-readable storage media, which can be read by machines (e.g.: computers). The machines refer to devices that call instructions stored in a storage medium, and can operate according to the called instructions, and the devices may include the display device 1200 according to the embodiments disclosed herein.

In case an instruction is executed by a processor, the processor may perform a function corresponding to the instruction by itself, or by using other components under its control. An instruction may include a code made by a compiler or a code executable by an interpreter. A storage medium that is readable by machines may be provided in the form of a non-transitory storage medium. Here, the term 'non-transitory' only means that a storage medium does not include signals, and is tangible, but does not indicate whether data is stored in the storage medium semi-permanently or temporarily.

According to an embodiment, certain aspects of the methods according to the various embodiments disclosed herein may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

According to certain embodiments, the display panel 1000 may further include at least one of a MUX circuit for selecting any one of the plurality of sub-pixels 10-1 to 10-3 constituting the pixel 10, an electro static discharge (ESD) circuit for preventing static electricity generated in the display panel 1000, a power circuit for supplying power to the driving circuits 301, or a clock providing circuit for providing a clock driving the driving circuits 301.

Figure 7:
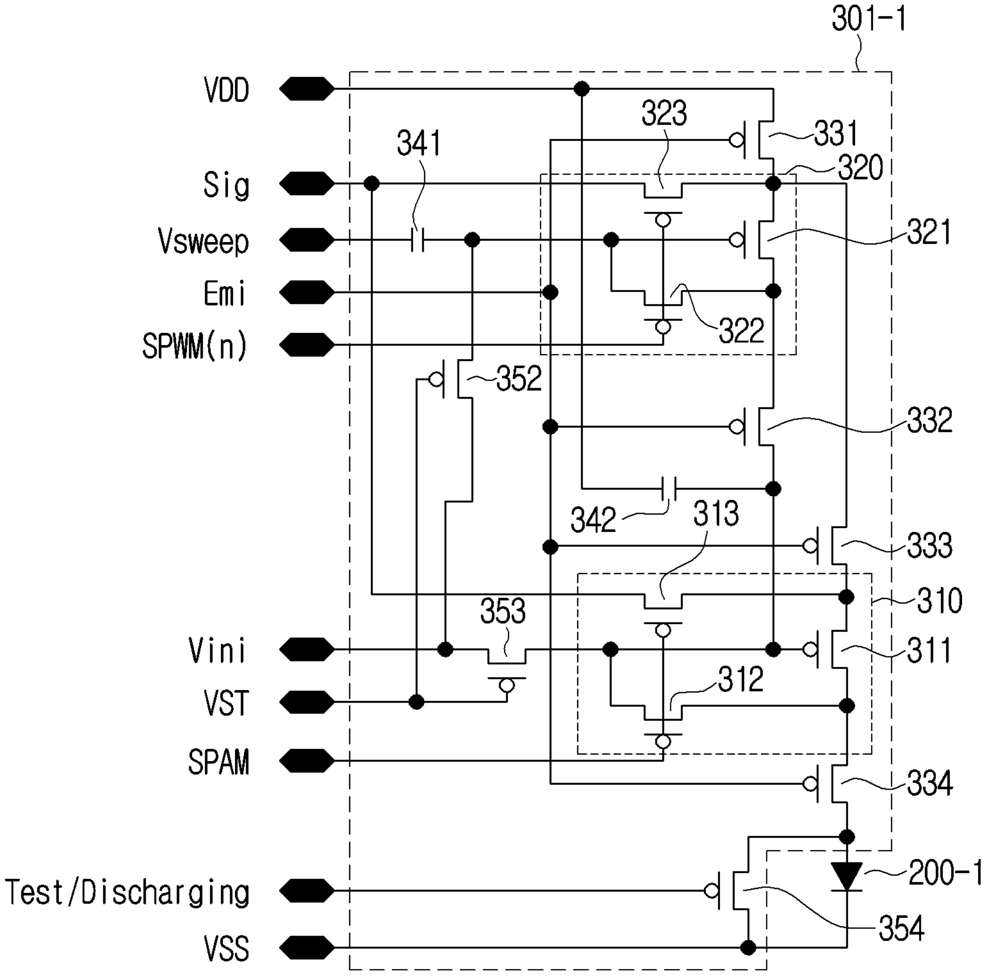
FIG. 7 is a circuit diagram of a first driving circuit according to an embodiment of the disclosure.

FIG. 7 is a circuit diagram of a first driving circuit according to an embodiment of the disclosure.

Referring to FIG. 7, the first driving circuit 301-1 according to an embodiment may include a constant current generation (CCG) circuit 310 and a PWM driving circuit 320.

The CCG circuit 310 may control the amount of the current provided to the first light emitting element 200-1, i.e., the amplitude of the driving current based on an applied data voltage, and the PWM driving circuit 320 may control the pulse width of the driving current provided to the first light emitting element 200-1 based on a PWM data voltage provided through the applied PWM line 371.

Specifically, according to an embodiment, the CCG circuit 310 may provide a driving current having an amplitude corresponding to a data voltage to the first light emitting element 200-1 based on a gate signal and a data signal provided through the data line 361 and the gate line 351, and the PWM driving circuit 320 may control the pulse width of the driving current by controlling the maintenance time of the driving current provided to the first light emitting element 200-1 by the CCG circuit 310 based on a PWM signal provided through the PWM line 371.

The first light emitting element 200-1 may emit light in various different luminances according to the amplitude or the pulse width of the driving current provided by the first driving circuit 300-1. Here, the pulse width of the driving current may also be expressed as a duty ratio of the driving current or a duration of the driving current.

The CCG circuit 310 may include a first driving transistor 311. The first driving transistor 311 may provide driving currents of different amplitudes to the first light emitting element 200-1 according to the size of a voltage applied through the gate line 351. Specifically, the CCG circuit 310 may provide a driving current having an amplitude corresponding to an applied data voltage to the first light emitting element 200-1 through the first driving transistor 311.

The PWM driving circuit 320 may include a second driving transistor 321. The second driving transistor 321 may be connected with the gate line 351 of the first driving transistor 311 and control the gate terminal voltage of the first driving transistor 311, and thereby control the pulse width of the driving current. Specifically, the second driving transistor 321 may control the pulse width of the driving current by turning off the first driving transistor 311 if the time interval corresponding to a PWM data voltage has passed after the first light emitting element 200-1 started emitting light according to provision of the driving current by the first driving transistor 311.

According to an embodiment, in a state where a first voltage based on the data voltage of the first driving transistor 311 is applied to the gate line 351 of the first driving transistor 311, and a second voltage based on the PWM data voltage of the second driving transistor 321 is applied to the gate terminal of the second driving transistor 321, if a driving voltage (VDD) is applied to the first light emitting element 200-1, the CCG circuit 310 may provide a driving current of an amplitude corresponding to the data voltage to the first light emitting element 200-1, and the first light emitting element 200-1 may emit light.

Hereinafter, driving of the first driving circuit 301-1 according to an embodiment will be described in detail based on the circuit diagram in FIG. 7.

The CCG circuit 310 may include a first driving transistor 311, a first transistor 312 connected between a drain terminal and a gate terminal of the first driving transistor 311, and a second transistor 313 in which its drain terminal is connected to a source terminal of the first driving transistor 311 and its gate terminal is connected to a gate terminal of the first transistor 312. A data signal (Sig) may be applied to the source terminal of the second transistor 313.

According to an embodiment, if a data voltage is applied through the source terminal of the second transistor 313 while the first and second transistors 312, 313 are turned on according to a SPAM control signal, the CCG circuit 310 may apply a first voltage to the gate terminal of the first driving transistor 311, the first voltage may be as much as the value of summing up the data voltage applied through the turned-on first driving transistor 311 and second transistor 312 and the threshold voltage of the first driving transistor 311.

The PWM driving circuit 320 may include a second driving transistor 321, a third transistor 322 connected between a drain terminal and a gate terminal of the second driving transistor 321, and a fourth transistor 323 in which its drain terminal is connected to a source terminal of the second driving transistor 321 and its gate terminal is connected to a gate terminal of the third transistor 322. A data signal (Sig) may be applied to the source terminal of the fourth transistor 323.

According to an embodiment, if a PWM data voltage is applied through the source terminal of the fourth transistor 323 while the third and fourth transistors 322, 323 are turned on according to a control signal (SPWM(n)), the PWM driving circuit 320 may apply a second voltage to the gate terminal of the second driving transistor 321, the second voltage may be as much as the value of summing up the PWM data voltage applied through the turned-on second driving transistor 321 and third transistor 322 and the threshold voltage of the second driving transistor 321.

A source terminal of the fifth transistor 331 may be connected to a driving voltage terminal (or a driving voltage signal) (VDD) of the first driving circuit 301-1, and a drain terminal of the fifth transistor 331 may be commonly connected to the drain terminal of the fourth transistor 323 and the source terminal of the second driving transistor 321. According to an embodiment, the fifth transistor 331 may be turned on/turned off according to a control signal (Emi), thus electronically connecting or separating the driving voltage terminal (VDD) and the PWM driving circuit 320.

A source terminal of the sixth transistor 332 may be connected to the drain terminal of the second driving transistor 321, and a drain terminal of the sixth transistor 332 may be connected to the gate terminal of the first driving transistor 311.

A source terminal of the seventh transistor 333 may be commonly connected to the source terminal of the second driving transistor 321, the drain terminal of the fourth transistor 323, and the drain terminal of the fifth transistor 331, and a drain terminal of the seventh transistor 333 may be commonly connected to the source terminal of the first driving transistor 311 and the drain terminal of the second transistor 313.

According to an embodiment, the sixth transistor 332 and the seventh transistor 333 may be turned on/turned off according to a control signal (Emi), thus electronically connecting or separating the PWM driving circuit 320 and the CCG circuit 310.

A source terminal of the eighth transistor 334 may be connected to the drain terminal of the first driving transistor 311, and a drain terminal of the eighth transistor 334 may be connected to an anode terminal of the first light emitting element 200-1. According to an embodiment, the eighth transistor 334 may be turned on/turned off according to a control signal (Emi), thus electronically connecting or separating the CCG circuit 310 and the first light emitting element 200-1.

One end of the first capacitor 341 may be commonly connected to the gate terminal of the second driving transistor 321 and the drain terminal of the third transistor 322, and the other end of the first capacitor 341 may be applied a sweep voltage (Vsweep) which is a voltage that linearly changes.

A drain terminal of the ninth transistor 353 may be commonly connected to the gate terminal of the first driving transistor 311 and the drain terminal of the first transistor 312, and a source terminal of the ninth transistor 353 may be applied an initial voltage (Vini). A source terminal of the tenth transistor 352 may be connected to the one end of the first capacitor 341, and a drain terminal of the tenth transistor 352 may be connected to the source terminal of the ninth transistor 353.

According to an embodiment, one end of the second capacitor 342 may be connected to the driving voltage terminal (VDD), and the other end of the second capacitor 342 may be commonly connected to the gate terminal of the first driving transistor 311, the drain terminal of the first transistor 312, the drain terminal of the ninth transistor 353, and the drain terminal of the sixth transistor 332.

The ninth transistor 353 and the tenth transistor 352 may be turned on according to a control signal VST, and apply the initial voltage (Vini) to the gate terminal of the first driving transistor 311 and the gate terminal of the second driving transistor 321.

According to an embodiment, the ninth transistor 353 and the tenth transistor 352 may maintain a state where the driving voltage (VDD) is turned on according to a control signal VST during a specific time interval even after the driving voltage (VDD) was applied to the one end of the second capacitor 342 to prevent the driving voltage (VDD) from being coupled to the gate terminal of the first driving transistor 311 through the second capacitor 342 after the gate terminal voltages of the first and second driving transistors 311, 321 were initialized. The ninth transistor 353 and the tenth transistor 352 may also be used to apply the initial voltage (Vini) to the gate terminals of the first and second driving transistors 311, 321.

The eleventh transistor 354 may be connected between the anode terminal and the cathode terminal of the first light emitting element 200-1. According to an embodiment, the eleventh transistor 354 may be turned on according to a control signal (Test) for checking whether the first driving circuit 300-1 is abnormal before the first light emitting element 200-1 is mounted on the TFT layer and electronically connected with the first driving circuit 300-1, and the eleventh transistor 354 may be turned on according to a control signal (Discharging) for discharging electric charges that remain in the first light emitting element 200-1 after the first light emitting element 200-1 is mounted on the TFT layer and electronically connected with the first driving circuit 300-1. The cathode terminal of the first light emitting element 200-1 may be connected to a ground voltage (VSS) terminal.

According to certain embodiments of the disclosure, the third driving circuit 301-3 may include a PWM driving circuit and a CCG circuit like the first driving circuit 301-1, and in one embodiment, the third driving circuit 301-3 may be implemented as a circuit that is identical or similar to the first driving circuit 301-1.

Figure 8:
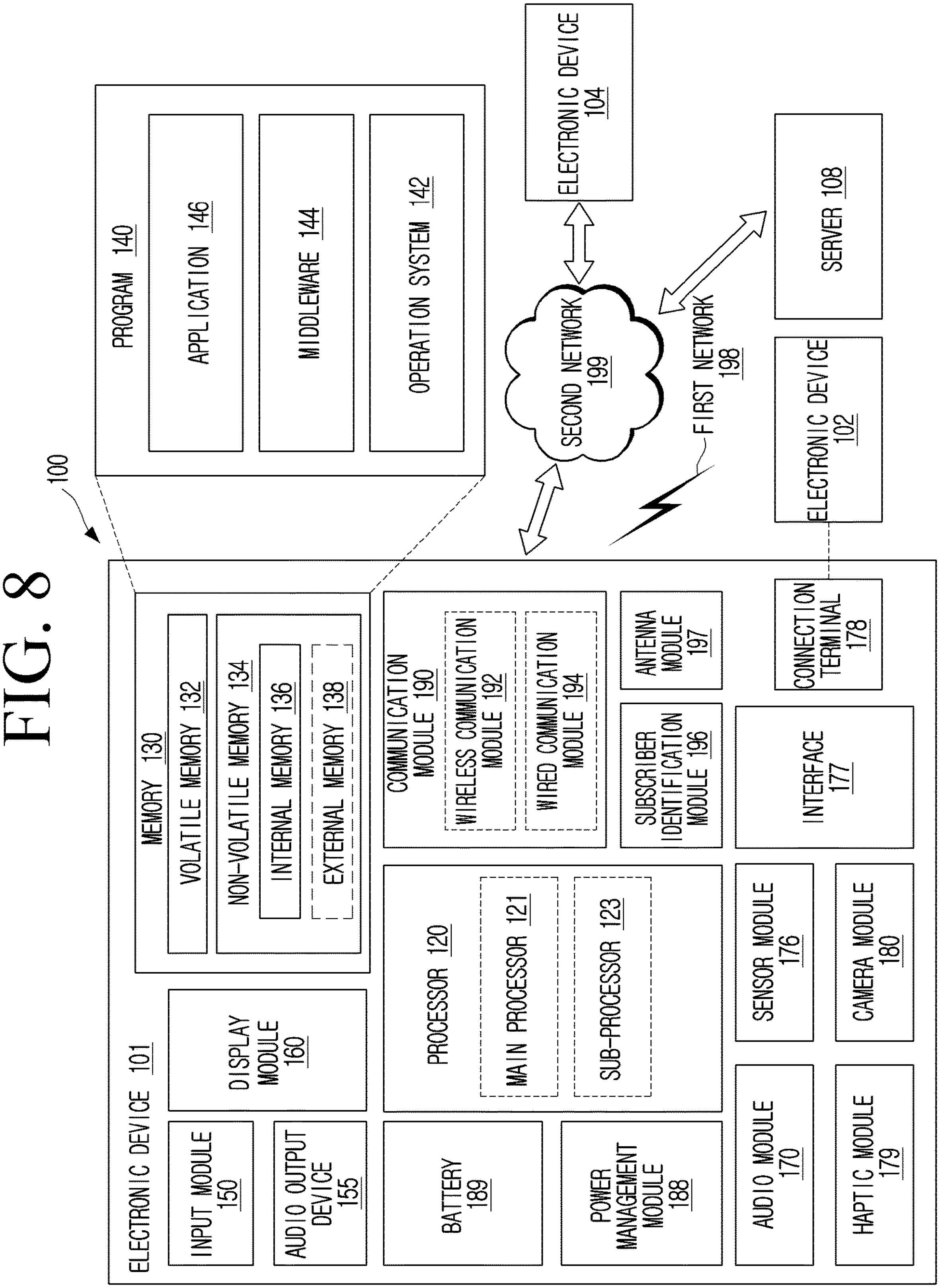
FIG. 8 is a block diagram of an electronic device in a network environment according to an embodiment of the disclosure.

FIG. 8 is a block diagram of an electronic device in a network environment according to an embodiment of the disclosure. For reference, hereinafter, the machine according to the various embodiments of the disclosure will be generally referred to as 'an electronic device 101' for the convenience of explanation, and the electronic device 101 may be a display device 1200 including the aforementioned display panel 1000.

Referring to FIG. 8, in a network environment 100, the electronic device 101 may communicate with the electronic device 102 through a first network 198 (e.g.: a near field wireless communication network), or communicate with at least one of the electronic device 104 or the server 108 through a second network 199 (e.g.: a long distance wireless communication network). According to an embodiment, the electronic device 101 may communicate with the electronic device 104 through the server 108. According to an embodiment, the electronic device 101 may include a processor 120, a memory 130, an input module 150, an audio output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, in the electronic device 101, at least one of these components (e.g.: the connection terminal 178) may be omitted, or one or more other components may be added. In some embodiments, some of these components (e.g.: the sensor module 176, the camera module 180, or the antenna module 197) may be integrated as one component (e.g.: the display module 160).

The processor 120 may, for example, execute software (e.g.: a program 140) and control at least one other component (e.g.: a hardware or software component) of the electronic device 101 connected to the processor 120, and perform various kinds of data processing or operations. According to an embodiment, as at least a part of such data processing or operations, the processor 120 may store instructions or data received from other components (e.g.: the sensor module 176 or the communication module 190) in a volatile memory 132, process the instructions or the data stored in the volatile memory 132, and store the result data in a non-volatile memory 134. According to an embodiment, the processor 120 may include a main processor 121 (e.g.: a central processing unit or an application processor) or a sub-processor 123 (e.g.: a graphic processing unit, a neural processing unit (NPU), an image signal processor, a sensor hub processor, or a communication processor) which can be operated independently from or together with the main processor 121. For example, in case the electronic device 101 includes the main processor 121 and the sub-processor 123, the sub-processor 123 may be set to use lower power than the main processor 121, or to be specified for a designated function. The sub-processor 123 may be implemented separately from the main processor 121, or as a part of it.

The sub-processor 123 may, for example, control at least some of functions or states related to at least one component (e.g.: the display module 160, the sensor module 176, or the communication module 190) among the components of the electronic device 101 in place of the main processor 121 while the main processor 121 is in an inactive (e.g.: sleep) state, or together with the main processor 121 while the main processor 121 is in an active (e.g.: application execution) state. According to an embodiment, the sub-processor 123 (e.g.: an image signal processor or a communication processor) may be implemented as a part of other components (e.g.: the camera module 180 or the communication module 190) that are functionally related. According to an embodiment, the sub-processor 123 (e.g.: a neural processing unit) may include a hardware structure specified for processing of an artificial intelligence model. An artificial intelligence model may be generated through machine learning. Such learning may be performed, for example, in the electronic device 101 itself wherein an artificial intelligence model is executed, or it may be performed through a separate server (e.g.: the server 108). Learning algorithms may include, for example, supervised learning, unsupervised learning, semi-supervised learning, or reinforcement learning, but they are not limited to the aforementioned examples. An artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-networks, or a combination of two or more of the aforementioned examples, but the artificial neural network is not limited to the aforementioned examples. An artificial intelligence model may additionally or alternatively include a software structure other than a hardware structure.

The memory 130 may store various data used by at least one component (e.g.: the processor 120 or the sensor module 176) of the electronic device 101. The data may include, for example, software (e.g.: a program 140), and input data or output data regarding instructions related thereto. The memory 130 may include a volatile memory 132 or a non-volatile memory 134.

The program 140 may be stored in the memory 130 as software, and it may include, for example, an operation system 142, middleware 144, or an application 146.

The input module 150 may receive instructions or data to be used for the components (e.g.: the processor 120) of the electronic device 101 from the outside (e.g.: a user) of the electronic device 101. The input module 150 may include, for example, a microphone, a mouse, a keyboard, keys (e.g.: buttons), or a digital pen (e.g.: a stylus pen).

The audio output module 155 may output an audio signal to the outside of the electronic device 101. The audio output module 155 may include, for example, a speaker or a receiver. The speaker may be used for general uses such as reproduction of multimedia or reproduction of recording. The receiver may be used for receiving an incoming call. According to an embodiment, the receiver may be implemented separately from the speaker, or as a part of it.

The display module 160 may visually provide information to the outside (e.g.: a user) of the electronic device 101. The display module 160 according to an embodiment may include, for example, the display panel 1000, or it may include a hologram device, or a projector and a control circuit for controlling the device. According to an embodiment, the display module 160 may include a touch sensor set to detect a touch, or a pressure sensor set to measure the strength of force generated by the touch.

The audio module 170 may convert a sound into an electronic signal, or on the contrary, convert an electronic signal into a sound. According to an embodiment, the audio module 170 may acquire a sound through the input module 150, or output a sound through the audio output module 155, or an external electronic device (e.g.: the electronic device 102) (e.g.: a speaker or a headphone) connected with the electronic device 101 directly or wirelessly.

The sensor module 176 may detect an operation state (e.g.: the power or the temperature) of the electronic device 101, or an external environmental state (e.g.: a user state), and generate an electronic signal or a data value corresponding to the detected state. According to an embodiment, the sensor module 176 may include, for example, a gesture sensor, a gyro sensor, an air pressure sensor, a magnetic sensor, an acceleration sensor, a grip sensor, a proximity sensor, a color sensor, an infrared (IR) sensor, a bio-sensor, a temperature sensor, a humidity sensor, or an illumination sensor.

The interface 177 may support one or more designated protocols that can be used for the electronic device 101 to be connected with an external electronic device (e.g.: the electronic device 102) directly or wirelessly. According to an embodiment, the interface 177 may include, for example, a high definition multimedia interface (HDMI), a universal serial bus (USB) interface, an SD card interface, or an audio interface.

The connection terminal 178 may include a connector through which the electronic device 101 can be physically connected with an external electronic device (e.g.: the electronic device 102). According to an embodiment, the connection terminal 178 may include, for example, an HDMI connector, a USB connector, an SD card connector, or an audio connector (e.g.: a headphone connector).

The haptic module 179 may convert an electronic signal into a mechanical stimulus (e.g.: vibration or a movement) or an electronic stimulus that a user can recognize through a tactile sensation or a movement sensation. According to an embodiment, the haptic module 179 may include, for example, a motor, a piezoelectric element, or an electronic stimulus device.

The camera module 180 may photograph still images and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell that cannot be recharged, a secondary cell that can be recharged, or a fuel cell.

The communication module 190 may establish a direct (e.g.: wired) communication channel or a wireless communication channel between the electronic device 101 and an external electronic device (e.g.: the electronic device 102, the electronic device 104, or the server 108), and support performance of communication through the established communication channel. The communication module 190 may be operated independently from the processor 120 (e.g.: an application processor), and include one or more communication processors that support direct (e.g.: wired) communication or wireless communication. According to an embodiment, the communication module 190 may include a wireless communication module 192 (e.g.: a cellular communication module, a near field wireless communication module, or a global navigation satellite system (GNSS) communication module) or a wired communication module 194 (e.g.: a local area network (LAN) communication module, or a power line communication module). A corresponding communication module among these communication modules may communicate with the external electronic device 104 through a first network 198 (e.g.: a near field communication network such as Bluetooth, wireless fidelity (WiFi) direct, or infrared data association (IrDA)) or a second network 199 (e.g.: a long distance communication network such as a legacy cellular network, a 5G network, a next generation communication network, the Internet, or a computer network (e.g.: a LAN or a WAN)). These several kinds of communication modules may be integrated as one component (e.g.: a single chip), or implemented as a plurality of components (e.g.: a plurality of chips) separate from one another. The wireless communication module 192 may identify or authenticate the electronic device 101 in a communication network such as the first network 198 or the second network 199 by using subscriber information (e.g.: an international mobile subscriber identity (IMSI)) stored in the subscriber identification module 196.

The wireless communication module 192 may support the 5G network after the 4G network and a next generation communication technology, e.g., a new radio (NR) access technology. The NR access technology may support high speed transmission of high capacity data (enhanced mobile broadband (eMBB)), minimalization of terminal power and access of a plurality of terminals (massive machine type communications (mMTC)), or high reliability and low latency (ultra-reliable and low-latency communications (URLLC)). The wireless communication module 192 may support, for example, a high frequency bandwidth (e.g.: an mmWave bandwidth) for achievement of a high data transmission rate. The wireless communication module 192 may support various technologies for securing performance in a high frequency bandwidth, e.g., technologies such as beam-forming, massive multiple-input and multiple-output (MIMO), full dimensional MIMO (FD-MIMO), an array antenna, analog beam-forming, or a large scale antenna. The wireless communication module 192 may support various requirements prescribed in the electronic device 101, an external electronic device (e.g.: the electronic device 104), or a network system (e.g.: the second network 199). According to an embodiment, the wireless communication module 192 may support a peak data rate (e.g.: 20 Gbps or higher) for realizing eMBB, a loss coverage (e.g.: 164 dB or lower) for realizing mMTC, or U-plane latency (e.g.: 0.5 ms or lower of each of a downlink (DL) and an uplink (UL), or 1 ms or lower of a round trip) for realizing URLLC.

The antenna module 197 may transmit a signal or power to the outside (e.g.: an external electronic device) or receive them from the outside. According to an embodiment, the antenna module 197 may include an antenna including an emitter consisting of a conductor or a conductive pattern formed on a substrate (e.g.: a PCB). According to an embodiment, the antenna module 197 may include a plurality of antennas (e.g.: array antennas). In this case, at least one antenna appropriate for a communication method used in a communication network such as the first network 198 or the second network 199 may be selected from the plurality of antennas by, for example, the communication module 190. A signal or power may be transmitted or received between the communication module 190 and an external electronic device through the selected at least one antenna. According to some embodiments, another component (e.g.: a radio frequency integrated circuit (RFIC)) may additionally be formed as a part of the antenna module 197 other than an emitter.

According to the various embodiments, the antenna module 197 may form an mmWave antenna module. According to an embodiment, an mmWave antenna module may include a printed circuit board, an RFIC which is arranged on the first surface (e.g.: the lower surface) of the printed circuit board or in an adjacent location thereto and which can support a designated high frequency bandwidth (e.g.: an mmWave bandwidth), and a plurality of antennas (e.g.: array antennas) which are arranged on the second surface (e.g.: the upper surface or the side surface) of the printed circuit board or in an adjacent location thereto and which can transmit or receive a signal of the designated high frequency bandwidth.

At least some of the above components may be connected with one another through a communication method between ambient devices (e.g.: a bus, general purpose input and output (GPIO), a serial peripheral interface (SPI), or a mobile industry processor interface (MIPI)), and exchange signals (e.g.: instructions or data) with one another.

According to an embodiment, instructions or data may be transmitted or received between the electronic device 101 and the external electronic device 104 through the server 108 connected to the second network 199. Each of the external electronic devices 102, or 104 may be a device of a type identical to or different from the electronic device 101. According to an embodiment, all or some of the operations executed in the electronic device 101 may be executed in one or more external electronic devices among the external electronic devices 102, 104, or 108. For example, in case the electronic device 101 needs to perform a specific function or service automatically, or in response to a request of a user or another device, the electronic device 101 may request one or more external electronic devices to perform at least a part of the function or the service instead of executing the function or the service by itself, or additionally. The one or more external electronic devices that received the request may execute at least a part of the requested function or service, or an additional function or service related to the request, and transmit the result of the execution to the electronic device 101. The electronic device 101 may process the result as it is or additionally, and provide the result as at least a part of the response for the request. For this, for example, could computing, distributive computing, mobile edge computing (MEC), or client-server computing technologies may be used. The electronic device 101 may, for example, provide a super low-latency service by using distributive computing or mobile edge computing. In another embodiment, the external electronic device 104 may include an Internet of Things (IoT) device. The server 108 may be an intelligent server using machine learning and/or a neural network. According to an embodiment, the external electronic device 104 or the server 108 may be included in the second network 199. The electronic device 101 may be applied to intelligent services (e.g.: smart home, smart city, smart car, or health care) based on 5G communication technologies and IoT-related technologies.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A display device including a plurality of light emitting diodes (LEDs), the display device comprising:

a substrate including a first driving circuit including a pulse width modulation (PWM) driving circuit and a second driving circuit including a pulse amplitude modulation (PAM) driving circuit, wherein the plurality of LEDs comprises:

a first LED configured to emit light of a first color, and which is controlled by the first driving circuit; and a second LED configured to emit light of a second color different from the first color, and which is controlled by the second driving circuit, wherein the first driving circuit controls driving of the first LED based on a color shift that correspond to a degree of color shift of the second LED, caused by gradation of the second LED.

2. The display device of claim 1, wherein the first driving circuit further comprises:

a constant current generation (CCG) circuit configured to control an amount of electric current provided to the first LED based on a data signal provided through a data line.

3. The display device of claim 1, wherein the substrate further comprises a third driving circuit including a PAM driving circuit, and wherein the plurality of LEDs further comprise a third LED configured to emit light of a third color different from the first color and the second color, and which is controlled by the third driving circuit.

4. The display device of claim 3, wherein, in the substrate, an area occupied by the first driving circuit is wider than an area occupied by the second driving circuit or an area occupied by the third driving circuit.

5. The display device of claim 3, wherein the first color is green, the second color is one of red or blue, and the third color is the other one of red or blue different from the second color.

6. The display device of claim 1, wherein the substrate further comprises: a third driving circuit including a PWM driving circuit, and wherein the plurality of LEDs comprise a third LED configured to emit light of a third color different from the first color and the second color, and which is controlled by the third driving circuit.

7. The display device of claim 6, wherein the third driving circuit further comprises a CCG circuit configured to control an amount of electric current provided to the third LED based on a data signal provided through a data line.

8. The display device of claim 1, wherein, in the substrate, an area occupied by the first driving circuit is wider than an area occupied by the second driving circuit.

9. The display device of claim 1, wherein, in the substrate, an area occupied by the first driving circuit overlaps with at least a part of a light emitting area where the second LED is arranged on the substrate.

10. The display device of claim 1, wherein the first driving circuit includes more transistors than the second driving circuit.

11. The display device of claim 1, further comprising:

a driving circuit layer including the first driving circuit for driving the plurality of LEDs, a gate line connected with the first driving circuit;

a PWM line disposed in a same direction as the gate line; and a display driver IC (DDI) configured to generate a signal and transmit the signal to the PWM line, wherein a PWM driving circuit controls a length of a light emitting period of the first LED based on the signal transmitted from the PWM line and a gradation signal.

12. A display panel including a plurality of light emitting diodes (LEDs), wherein the plurality of LEDs comprises:

a first LED configured to emit light of a first color, and which is controlled by a first driving circuit; and a second LED configured to emit light of a second color different from the first color, and which is controlled by a second driving circuit, and the first driving circuit is driven such that a length of a light emitting period of the first LED is changed as a gradation of the first LED is changed, and the second driving circuit is driven such that a length of a light emitting period of the second LED is maintained as a gradation of the second LED is changed, wherein the first driving circuit controls driving of the first LED based on a color shift that correspond to a degree of color shift of the second LED, caused by gradation of the second LED.

13. The display panel of claim 12, wherein the first driving circuit and the second driving circuit are provided on a substrate, and wherein in the substrate, an area occupied by the first driving circuit is wider than an area occupied by the second driving circuit.

* * * * *